United States Patent
Iwami et al.

(10) Patent No.: US 10,849,171 B2
(45) Date of Patent: Nov. 24, 2020

(54) DEVICE AND METHOD FOR MAINTAINING A SECURITY LEVEL

(71) Applicant: SONY CORPORATION, Tokyo (JP)

(72) Inventors: Hideki Iwami, Saitama (JP); Tomoya Yamaura, Tokyo (JP); Hideyuki Suzuki, Tokyo (JP)

(73) Assignee: SONY CORPORATION, Tokyo (JP)

( * ) Notice: Subject to any disclaimer, the term of this patent is extended or adjusted under 35 U.S.C. 154(b) by 0 days.

(21) Appl. No.: 15/773,457

(22) PCT Filed: Aug. 25, 2016

(86) PCT No.: PCT/JP2016/074788
§ 371 (c)(1),
(2) Date: May 3, 2018

(87) PCT Pub. No.: WO2017/085978
PCT Pub. Date: May 26, 2017

(65) Prior Publication Data
US 2018/0324876 A1  Nov. 8, 2018

(30) Foreign Application Priority Data
Nov. 19, 2015 (JP) ................. 2015-226906

(51) Int. Cl.
*H04W 76/10* (2018.01)
*H04W 84/12* (2009.01)
*H04W 92/18* (2009.01)

(52) U.S. Cl.
CPC ........... *H04W 76/10* (2018.02); *H04W 84/12* (2013.01); *H04W 92/18* (2013.01)

(58) Field of Classification Search
CPC ....... H04W 4/02; H04W 4/021; H04W 4/029; H04W 4/80; H04W 8/005; H04W 76/10; H04W 76/14; H04W 84/12; H04W 92/18
See application file for complete search history.

(56) References Cited

U.S. PATENT DOCUMENTS 6,058,106 A * 5/2000 Cudak ................. H04W 52/383
370/313
6,804,532 B1 * 10/2004 Moon ..................... H04L 45/22
455/552.1

(Continued)

FOREIGN PATENT DOCUMENTS

CN    103026741 A    4/2013
CN    103828412 A    5/2014

(Continued)

OTHER PUBLICATIONS

"Wi-Fi Simple Configuration Technical Specification", Version 2.0. 5, 155 pages.

(Continued)

*Primary Examiner* — Eric Nowlin
(74) *Attorney, Agent, or Firm* — Chip Law Group

(57) ABSTRACT

Provided is a mechanism capable of maintaining the security level while simplifying the WPS protocol. A device includes a processing unit that notifies an access point of a message used to instruct the access point to establish a connection for infrastructure communication with another device on condition that a connection for P2P communication with the other device is established, a connection for infrastructure communication with the access point is established or there is a history in which the connection has been established, and a connection for infrastructure communication between the other device and the access point is not established.

18 Claims, 21 Drawing Sheets

(56) References Cited

U.S. PATENT DOCUMENTS

| | | | | |
|---|---|---|---|---|
| 6,862,500 B2* | 3/2005 | Tzamaloukas | G01C 21/26 | 340/991 |
| 6,925,378 B2* | 8/2005 | Tzamaloukas | G01C 21/32 | 455/456.1 |
| 7,239,874 B2* | 7/2007 | Reddy | H04W 64/00 | 455/436 |
| 7,656,849 B1* | 2/2010 | Evans | H04W 76/14 | 370/338 |
| 7,899,017 B2* | 3/2011 | Yu | H04W 48/18 | 370/338 |
| 7,966,036 B2* | 6/2011 | Kojima | H04W 76/23 | 455/552.1 |
| 8,493,896 B2* | 7/2013 | Yu | H04W 48/18 | 370/310 |
| 8,966,601 B2* | 2/2015 | Green | H04L 9/0827 | 726/7 |
| 9,125,105 B2* | 9/2015 | Kwon | H04B 7/15542 | |
| 9,288,729 B2* | 3/2016 | Jang | H04W 36/0005 | |
| 9,510,162 B2* | 11/2016 | Yu | H04W 4/08 | |
| 9,654,960 B2* | 5/2017 | Zhou | H04W 76/14 | |
| 9,730,082 B2* | 8/2017 | Park | H04W 16/26 | |
| 9,788,255 B2* | 10/2017 | Villasenor | H04W 40/14 | |
| 9,906,987 B2* | 2/2018 | Kwon | H04W 88/04 | |
| 9,949,302 B2* | 4/2018 | Price | H04B 17/318 | |
| 9,949,305 B2* | 4/2018 | Montemurro | H04L 67/1068 | |
| 10,142,423 B2* | 11/2018 | Verger | H04L 65/1083 | |
| 10,342,057 B2* | 7/2019 | Suga | H04W 84/12 | |
| 10,368,232 B2* | 7/2019 | Sandhu | H04W 8/005 | |
| 10,455,632 B2* | 10/2019 | Baron | H04W 8/005 | |
| 2004/0127214 A1* | 7/2004 | Reddy | H04W 64/00 | 455/426.2 |
| 2004/0230345 A1* | 11/2004 | Tzamaloukas | G01C 21/26 | 701/1 |
| 2004/0230370 A1* | 11/2004 | Tzamaloukas | G01C 21/32 | 701/400 |
| 2006/0073847 A1* | 4/2006 | Pirzada | H04W 88/06 | 455/556.2 |
| 2006/0215576 A1* | 9/2006 | Yu | H04W 48/18 | 370/252 |
| 2007/0140191 A1* | 6/2007 | Kojima | H04W 76/23 | 370/338 |
| 2009/0022130 A1* | 1/2009 | Yu | H04W 48/18 | 370/338 |
| 2010/0254349 A1* | 10/2010 | Aibara | H04W 36/385 | 370/331 |
| 2011/0038311 A1* | 2/2011 | Marin | H04W 68/00 | 370/328 |
| 2011/0082939 A1* | 4/2011 | Montemurro | H04W 76/14 | 709/227 |
| 2011/0082940 A1* | 4/2011 | Montemurro | H04L 67/104 | 709/227 |
| 2011/0280234 A1 | 11/2011 | Wentink et al. | | |
| 2012/0102207 A1 | 4/2012 | Salowey et al. | | |
| 2013/0003689 A1* | 1/2013 | Kwon | H04B 7/15557 | 370/329 |
| 2013/0081113 A1 | 3/2013 | Cherian et al. | | |
| 2013/0201954 A1* | 8/2013 | Gao | H04W 72/0413 | 370/329 |
| 2013/0311666 A1 | 11/2013 | Fujii | | |
| 2014/0056209 A1* | 2/2014 | Park | H04W 16/26 | 370/315 |
| 2014/0254577 A1* | 9/2014 | Wright | H04W 12/003 | 370/338 |
| 2014/0357269 A1 | 12/2014 | Zhou et al. | | |
| 2014/0362841 A1 | 12/2014 | Shibata | | |
| 2015/0172905 A1 | 6/2015 | Qi et al. | | |
| 2015/0195686 A1* | 7/2015 | Yu | H04W 4/08 | 370/338 |
| 2015/0305070 A1* | 10/2015 | Ahmad | H04W 76/14 | 370/338 |
| 2016/0021007 A1* | 1/2016 | Shuman | H04W 28/0289 | 370/235 |
| 2016/0057796 A1* | 2/2016 | Kim | H04W 76/14 | 370/338 |
| 2016/0066247 A1* | 3/2016 | Villasenor | H04W 40/14 | 370/338 |
| 2016/0105829 A1* | 4/2016 | Wentink | H04W 8/005 | 370/338 |
| 2016/0105850 A1* | 4/2016 | Wentink | H04W 8/005 | 370/311 |
| 2016/0127424 A1 | 5/2016 | Lee et al. | | |
| 2016/0135017 A1* | 5/2016 | Wu | H04W 4/08 | 370/350 |
| 2016/0182624 A1* | 6/2016 | Liang | H04W 12/06 | 709/228 |
| 2017/0041779 A1* | 2/2017 | Sandhu | H04W 8/005 | |
| 2017/0070919 A1* | 3/2017 | Verger | H04L 65/1083 | |
| 2017/0094581 A1* | 3/2017 | Sun | H04L 45/745 | |
| 2017/0164186 A1* | 6/2017 | Yong | H04W 76/14 | |
| 2017/0339736 A1* | 11/2017 | Suga | H04W 84/12 | |
| 2018/0063298 A1 | 3/2018 | Fujii | | |
| 2018/0152977 A1* | 5/2018 | Baron | H04W 48/16 | |
| 2018/0235021 A1* | 8/2018 | Montemurro | H04L 67/1068 | |
| 2018/0324876 A1* | 11/2018 | Iwami | H04W 84/12 | |
| 2019/0082389 A1* | 3/2019 | Wentink | H04W 8/005 | |
| 2019/0098679 A1* | 3/2019 | Lin | H04W 76/12 | |
| 2019/0098680 A1* | 3/2019 | Park | H04W 76/14 | |
| 2019/0141137 A1* | 5/2019 | Verger | H04L 65/1083 | |
| 2019/0199791 A1* | 6/2019 | Klemets | H04L 69/14 | |
| 2019/0200281 A1* | 6/2019 | Inohiza | H04W 76/14 | |
| 2019/0297657 A1* | 9/2019 | Suga | H04N 1/32765 | |
| 2020/0177675 A1* | 6/2020 | Tamura | H04W 48/16 | |

FOREIGN PATENT DOCUMENTS

| | | | | |
|---|---|---|---|---|
| CN | 105340330 A | | 2/2016 | |
| CN | 105764131 A | * | 7/2016 | H04W 4/08 |
| JP | 2013-527717 A | | 6/2013 | |
| JP | 2013-527717 A | | 6/2013 | |
| JP | 2013-243427 A | | 12/2013 | |
| JP | 2014-531862 A | | 11/2014 | |
| JP | 2014-531862 A | | 11/2014 | |
| JP | 2014-241487 A | | 12/2014 | |
| JP | 2014-241487 A | | 12/2014 | |
| JP | 2016-528777 A | | 9/2016 | |
| KR | 10-2013-0040913 A | | 4/2013 | |
| KR | 10-2014-0067157 A | | 6/2014 | |
| KR | 20140119547 A | * | 10/2014 | H04W 76/14 |
| KR | 10-2016-0026866 A | | 3/2016 | |
| WO | WO-2011019501 A1 | * | 2/2011 | H04W 76/14 |
| WO | WO-2011059818 A1 | * | 5/2011 | H04W 72/085 |
| WO | 2011/146513 A1 | | 11/2011 | |
| WO | 2013/049292 A1 | | 4/2013 | |
| WO | WO-2014071140 A2 | * | 5/2014 | H04W 76/14 |
| WO | WO-2014163347 A1 | * | 10/2014 | H04W 76/14 |
| WO | 2014/208878 A1 | | 12/2014 | |
| WO | WO-2014193557 A1 | * | 12/2014 | H04W 8/005 |

OTHER PUBLICATIONS

"Wi-Fi Simple Configuration Technical Specification Version 2.0.5", 2014 Wi-Fi Alliance, 155 pages.

International Search Report and Written Opinion of PCT Application No. PCT/JP2016/074788, dated Nov. 22, 2016, 9 pages.

Extended European Search Report of EP Patent Application No. 16865981.1, dated Jul. 6, 2018, 09 pages.

"Wi-Fi Simple Configuration Technical Specification" Version 2.0.5, Wi-Fi Alliance, 155 pages.

Office Action for EP Patent Application No. 16865981.1, dated Feb. 17, 2020, 08 pages of Office Action.

* cited by examiner

DEVICE AND METHOD FOR MAINTAINING A SECURITY LEVEL

CROSS REFERENCE TO RELATED APPLICATIONS

This application is a U.S. National Phase of International Patent Application No. PCT/JP2016/074788 filed on Aug. 25, 2016, which claims priority benefit of Japanese Patent Application No. JP 2015-226906 filed in the Japan Patent Office on Nov. 19, 2015. Each of the above-referenced applications is hereby incorporated herein by reference in its entirety.

TECHNICAL FIELD

The present disclosure relates to a device and a method.

BACKGROUND ART

The Wireless Fidelity (Wi-Fi, registered trademark) Alliance creates Wi-Fi protected setup (WPS, registered trademark) as a technique of facilitating encryption setting between wireless local area network (LAN) devices. WPS-compatible devices can easily perform complicated settings necessary to enable wireless LAN security. Moreover, the standard for WPS is defined in Non-Patent Literature 1 below. WPS is also sometimes referred to as Wi-Fi simple configuration (WSC) or WSC exchange.

The protocol for use of WPS includes push button method and personal identification number (PIN) code method. In the push button method, security setup is performed by depressing a button provided on each of an enrollee that gains access to a network and a registrar that registers the enrollee in the network. In the PIN code method, security setup is performed by registering the PIN code of the enrollee in the registrar.

CITATION LIST

Non-Patent Literature

Non-Patent Literature 1: Wi-Fi Alliance, "Wi-Fi Simple Configuration Technical Specification", Version 2.0.5, 2014

DISCLOSURE OF INVENTION

Technical Problem

In either protocol, however, it takes considerable time and effort to complete the security setup of the enrollee. However, only simplification of the protocol may cause the deterioration in the security level.

Thus, it is desirable to provide a mechanism capable of maintaining the security level while simplifying the WPS protocol.

Solution to Problem

According to the present disclosure, there is provided a device including: a processing unit configured to notify an access point of a message used to instruct the access point to establish a connection for infrastructure communication with another device on condition that a connection for P2P communication with the other device is established, a connection for infrastructure communication with the access point is established or there is a history in which the connection has been established, and a connection for infrastructure communication between the other device and the access point is not established.

In addition, according to the present disclosure, there is provided a device including: a processing unit configured to start processing for establishing a connection for infrastructure communication with a second terminal device by using reception of a notification of a message from a first terminal device as a trigger, the message being used to instruct to start the connection for infrastructure communication with the second terminal device and being notified from the first terminal device in which a connection for infrastructure communication with its own device is established or there is a history in which the connection has been established and a connection for P2P communication with the second terminal device is established.

In addition, according to the present disclosure, there is provided a device including: a processing unit configured to notify another device of configuration information used for a connection for P2P communication with the other device by using infrastructure communication via an access point on condition that a connection for infrastructure communication with the access point is established and a connection for infrastructure communication between another terminal and the access point is established.

In addition, according to the present disclosure, there is provided a method including: notifying, by a processor, an access point of a message used to instruct the access point to establish a connection for infrastructure communication with another device, on condition that a connection for P2P communication with the other device is established, a connection for infrastructure communication with the access point is established or there is a history in which the connection has been established, and a connection for infrastructure communication between the other device and the access point is not established.

Advantageous Effects of Invention

According to the present disclosure as described above, a mechanism capable of maintaining the security level while simplifying the WPS protocol is provided. Note that the effects described above are not necessarily limitative. With or in the place of the above effects, there may be achieved any one of the effects described in this specification or other effects that may be grasped from this specification.

MODE(S) FOR CARRYING OUT THE INVENTION

Figure 1:
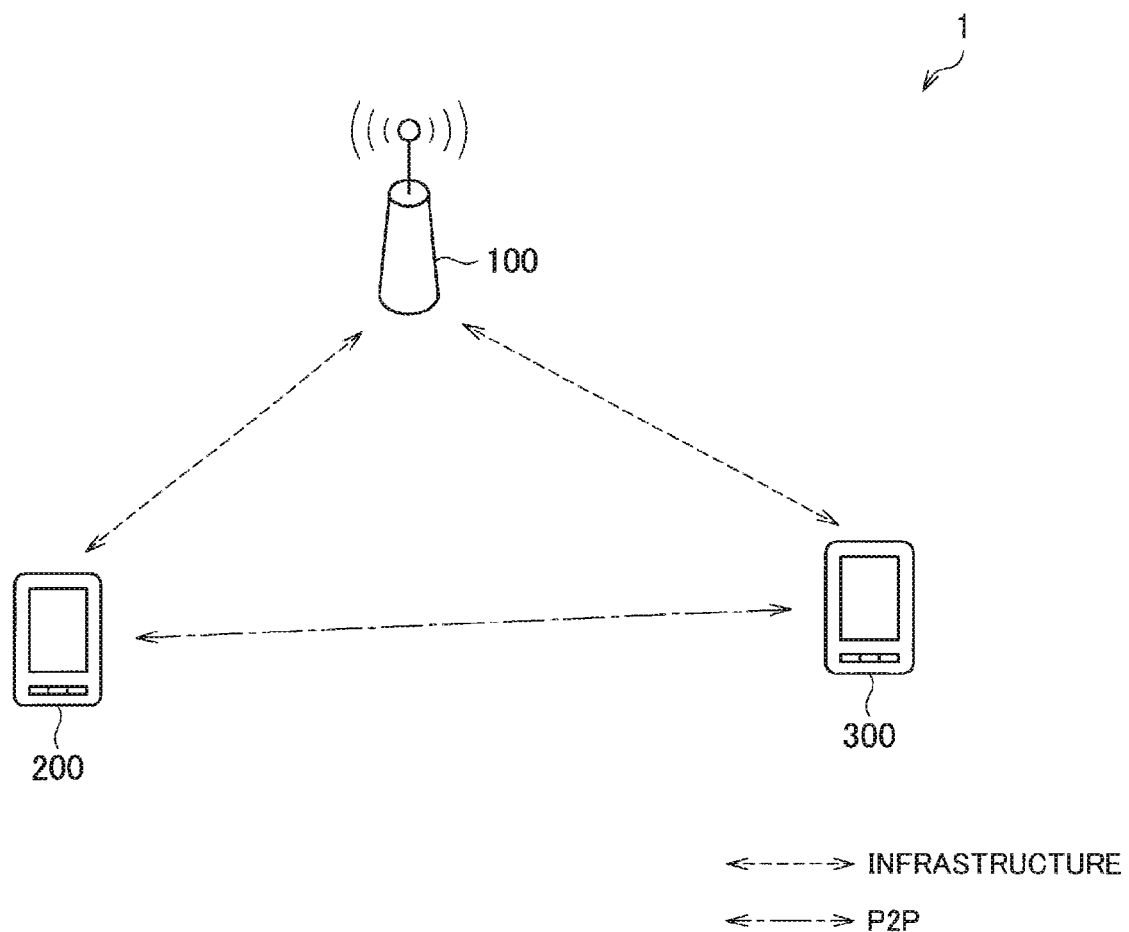
FIG. 1 is a diagram illustrated to describe an exemplary configuration of a system according to an embodiment of the present disclosure.

Hereinafter, (a) preferred embodiment(s) of the present disclosure will be described in detail with reference to the appended drawings. Note that, in this specification and the appended drawings, structural elements that have substantially the same function and structure are denoted with the same reference numerals, and repeated explanation of these structural elements is omitted.

Moreover, the description will be given in the following order.

1. Introduction
1.1. Exemplary configuration of system
1.2. WPS
1.3. Miracast
2. Exemplary configuration of each device
2.1. Exemplary configuration of AP
2.2. Exemplary configuration of STA
3. First Embodiment
3.1. Situation setting
3.2. Technical problem
3.3. Technical features
3.4. Processing procedure
4. Second Embodiment
4.1. Situation setting
4.2. Technical problem
4.3. Technical features
4.4. Processing procedure
5. Application examples
6. Closing remarks

1. Introduction

<1.1. Exemplary Configuration of System>

FIG. 1 is a diagram illustrated to describe an exemplary configuration of a system 1 according to an embodiment of the present disclosure. As illustrated in FIG. 1, the system 1 includes information processing devices 100, 200, and 300. The information processing devices 100, 200, and 300 are wireless communication devices capable of performing communication compliant to any wireless communication standards. Examples of specific wireless communication standards include Institute of Electrical and Electronics Engineers (IEEE) 802.11, IEEE 802.15, IEEE 802.16, third generation partnership project (3GPP) standard (e.g., wideband code division multiple access (W-CDMA)), global system for mobile communications (GSM, registered trademark), worldwide interoperability for microwave access (WiMAX), WiMAX2, Wi-Fi, long-term evolution (LTE), and LTE-Advanced (LTE-A).

In one example, the information processing devices 100, 200, and 300 are assumed to be capable of performing communication using a wireless LAN. In one example, the information processing device 100 is an access point (AP) that provides a wireless LAN service. The information processing devices 200 and 300 are stations (STAs), each of which establishes a connection with the AP 100 and receives the wireless LAN service. The STAs 200 and 300 can communicate with each other via the AP 100 using infrastructure communication with the AP 100.

Further, the STAs 200 and 300 can communicate directly with each other using P2P communication. This can be achieved using, in one example, Wi-Fi Direct (registered trademark), Tunneled Direct Link Setup (TDLS), ad hoc network, mesh network, or the like.

<1.2. WPS>

In the system 1, WPS allows an enrollee to access the network. In one example, the STA 200 may be a registrar (a first terminal device), and the STA 300 may be an enrollee (a second terminal device).

The protocol for the push button method will be described below in detail with reference to FIG. 2.

Figure 2:
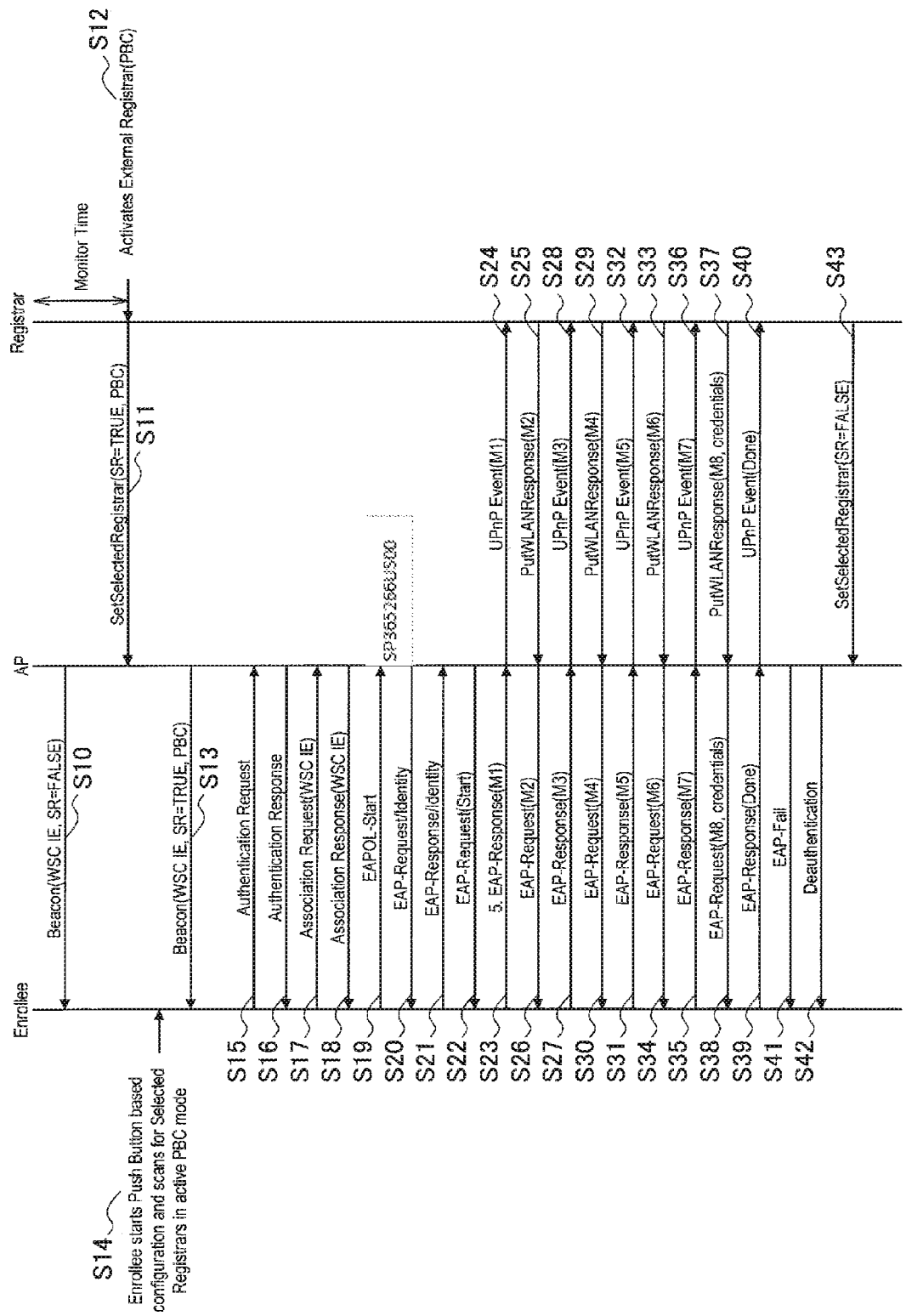
FIG. 2 is a sequence diagram illustrating an example of a procedure of a PBC-based connection protocol in WPS.

FIG. 2 is a sequence diagram illustrating an example of a procedure of a PBC-based connection protocol in WPS. This sequence involves a registrar, an enrollee, and an AP. This sequence is an example in which connection is initiated by an external registrar that is set as a starting point.

As illustrated in FIG. 2, the AP first broadcasts a beacon (step S10). This beacon includes a WSC information element (IE) in which selected registrar (SR)=False is registered. When a button is depressed during a monitoring time, the registrar is shifted to the PBC mode, and the function as a registrar is activated (step S11). Next, the registrar notifies the AP of SetSelectedRegistrar (SR=TRUE, PBC) (step S12). Moreover, an MAC address of the enrollee (wildcard MAC address if unknown) is set in this message. The AP, when receiving SetSelectedRegistrar in which SR=TRUE is set, broadcasts the beacon including WSC IE in which SR=TRUE, registrar configuration method=PBC, and MAC address set in SetSelectedRegistrar are registered (step S13).

On the other hand, when the button is depressed and the PBC mode is entered, the enrollee scans for an AP in which PBC mode is activated (step S14). Specifically, the enrollee searches for a beacon (or probe response) in which SR=TRUE is set.

Then, the enrollee notifies the AP of Authentication Request (step S15). Next, the AP notifies the enrollee of Authentication Response (step S16). Next, the enrollee notifies the AP of Association Request (WSC IE) (step S17). Next, the AP notifies the enrollee of Association Response (WSC IE) (step S18).

Then, the enrollee notifies the AP of EAPOL-Start (step S19). Next, the AP notifies the enrollee of EAP-Request/Identity (step S20). Next, the enrollee notifies the AP of EAP-Response/Identity (step S21). Next, the AP notifies the enrollee of EAP-Request (Start) (step S22).

The enrollee notifies an M1 message (EAP-Response (M1)) (step S23). This M1 message is intended to notify the external registrar that a universal plug and play (UPnP) event is approved. The AP notifies the registrar of the UPnP Event (M1) (step S24). Next, the registrar notifies the AP of PutWLANResponse (M2) (step S25). The AP notifies the enrollee of EAP-Request (M2) (step S26).

Then, the enrollee notifies the AP of EAP-Response (M3) (step S27). The AP notifies the registrar of UPnP Event (M3) (step S28). Next, the registrar notifies the AP of PutWLAN-Response (M4) (step S29). The AP notifies the enrollee of the EAP-Request (M4) (step S30).

Then, the enrollee notifies the AP of EAP-Response (M5) (step S31). The AP notifies the registrar of UPnP Event (M5) (step S32). Next, the registrar notifies the AP of PutWLAN-Response (M6) (step S33). The AP notifies the enrollee of the EAP-Request (M6) (step S34).

Then, the enrollee notifies the AP of EAP-Response (M7) (step S35). The AP notifies the registrar of UPnP Event (M7) (step S36). Next, the registrar notifies the AP of PutWLAN-Response (M8, credentials) (step S37). The AP notifies the enrollee of EAP-Request (M8, credentials) (step S38).

Then, the enrollee notifies the AP of EAP-Response (Done) (step S39). The AP notifies the registrar of UPnP Event (Done) (step S40). In addition, the AP notifies the enrollee of EAP-Fail (step S41), and notifies the enrollee of Deauthentication (step S42).

Finally, the registrar notifies the AP of SetSelectedRegistrar (SR=False), sets the SetSelectedRegistrar attribute of the AP to False, and then ends the processing (step S43).

Figure 6:
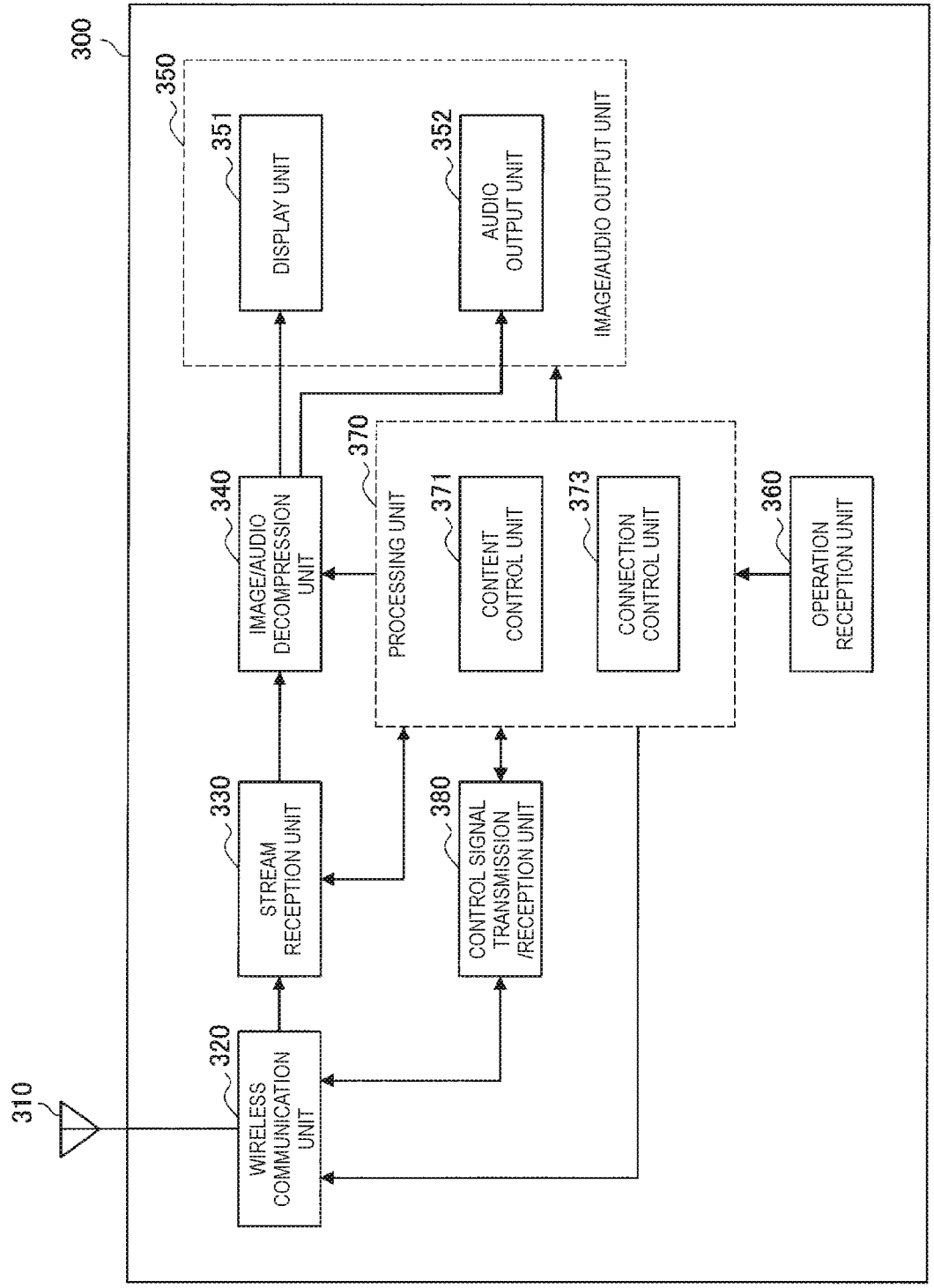
FIG. 6 is a block diagram illustrating an example of a logical configuration of a sink device according to an embodiment of the present disclosure.

Moreover, this sequence is disclosed in FIG. 6 of Non-Patent Literature 1. Refer to the above-mentioned Non-Patent Literature 1 for a detailed description and examples other than this sequence.

<1.3. Miracast>

In the system 1, in one example, Wi-Fi CERTIFIED Miracast (registered trademark) (hereinafter also simply referred to as Miracast) can be used. Miracast is a short-range wireless audio/visual (AV) transmission communication system with technical specification titled Wi-Fi Display. Miracast is mirroring technology that uses Wi-Fi Direct or TDLS allowing content, such as audio and display image, reproduced on one terminal to be transmitted to another terminal and to be output on the other terminal in a similar manner.

Miracast enables user input back channel (UIBC) over transmission control protocol/Internet protocol (TCP/IP). UIBC is a technique of transmitting operation information of an input device, such as a mouse or keyboard, from one terminal to another terminal. Moreover, other remote desktop software (e.g., virtual network computing (VNC)) may be used, instead of Miracast.

Miracast defines the compression and decompression of an image (or video) using in one example, H.264. In Miracast, however, it is possible to perform adjustment for H.264 on the transmitter. Moreover, Miracast can also support, in one example, H.265 (e.g., high efficiency video coding (HEVC) and scalable video coding extensions of high efficiency video coding (SHVC)), moving picture experts group (MPEG) 4, or joint photographic experts group (JPEG) 2000, in addition to H.264. In addition, Miracast can support compression of, in one example, bundling one line or more. In addition, Miracast can support line-based codec (e.g., Wavelet or discrete cosine transform (DCT)) that performs compression and decompression by dividing two or more lines into 2×2 or more macroblocks. In addition, Miracast can support a codec having reduced transmission rate without compressing DCT, Wavelet, or the like, by obtaining the difference between a specific code amount region (picture, a bundle of a plurality of lines, or macroblock) and the pre-coding amount region. In addition, Miracast can also support transmission and reception of an uncompressed image (or video).

In Miracast, a terminal on the side of transmitting content is also referred to as a source device, and a terminal on the side of receiving content is also referred to as a sink device. The source device may set the image data and audio data generated by the imaging operation as a target to be transmitted, or may set the content stored in a storage unit (e.g., a hard disk) as a target to be transmitted. Furthermore, in the case where the source device has the tethering feature, the source device may set the content stored in the internet service provider (ISP) via a wireless or wired network as a target to be transmitted. The source device can be implemented as a camera-equipped electronic device, such as camera, personal computer (PC), game console, smartphone, or tablet terminal. On the other hand, the sink device can be implemented as an electronic device equipped with an output device (e.g., a display or a speaker), such as camera, personal computer (PC), game console, smartphone, or tablet terminal.

One of the STA 200 and the STA 300 functions as the source device and the other functions as the sink device. The description will be given, in one example, on the assumption that the STA 200 is the source device and the STA 300 is the sink device.

An example of the exchange using a command in Miracast will be described below with reference to FIG. 3.

Figure 3:
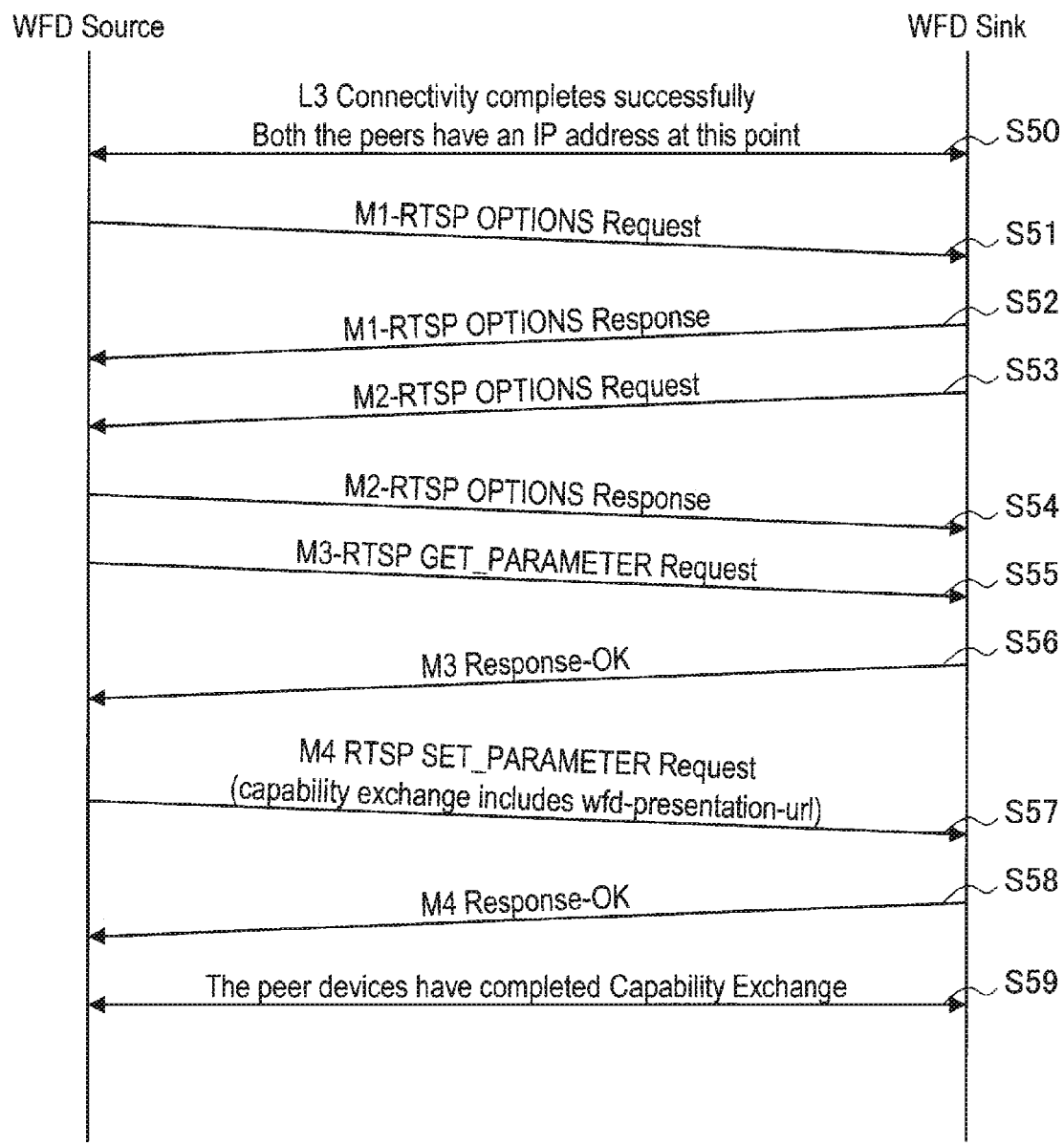
FIG. 3 is a sequence diagram illustrating an example of a procedure of exchanging a command in Miracast.

FIG. 3 is a sequence diagram illustrating an example of a command exchange flow in Miracast. This sequence involves the source device and the sink device. This sequence illustrates an example of Wi-Fi Display (WFD) capability negotiation flow using real time streaming protocol (RTSP).

As illustrated in FIG. 3, the source device and the sink device establish a Layer 3 connection successfully, and the source device and the sink device have both an IP address at this time (step S50).

Then, the source device notifies the sink device of M1-RTSP OPTIONS Request (step S51). The sink device notifies the source device of M1-RTSP OPTIONS Response (step S52).

Then, the sink device notifies the source device of M2-RTSP OPTIONS Request (step S53). The source device notifies the sink device of M2-RTSP OPTIONS Response (step S54).

Then, the source device notifies the sink device of M3-RTSP GET_PARAMETER Request (step S55). The sink device notifies the source device of M3 Response-OK (step S56).

Then, the source device notifies the sink device of M4 RTSP SET_PARAMETER Request (step S57). The sink device notifies the source device of M4 Response-OK (step S58).

As a result, the exchange of information between the source device and the sink device is completed (step S59).

In one example, an M3 message (M3-RTSP GET_PARAMETER Request and M3 Response) may be used for the exchange of information. Alternatively, the M3 message may be omitted, and information to be exchanged may be included in a message transmitted from the source device to the sink device. In one example, in the case where the source device and the sink device perform a content protection setup, they perform the link protection setup after the M3 Response. Then, the source device and the sink device can communicate with each other while ensuring the privacy of the link that has been set once by only performing exchange of M4 and the subsequent messages.

The RTSP M3 Response may include information related to the sink device, as follows:
Audio format(s) supported by the WFD Sink
Video format(s) support by the WFD Sink
3D formats supported by the WFD Sink
The HDCP system 2.0/2.1/2.2 support/control port
Available EDID information of display attached to the WFD Sink
Coupled WFD Sink information
RTP port(s) the WFD sink(s) listen on
Supports I2C commands and port number
UIBC capability supported
WFD Source uses this parameter to obtain the connector type currently active on the WFD Sink
Indicate the support for standby and resume control using RTSP.

Figure 4:
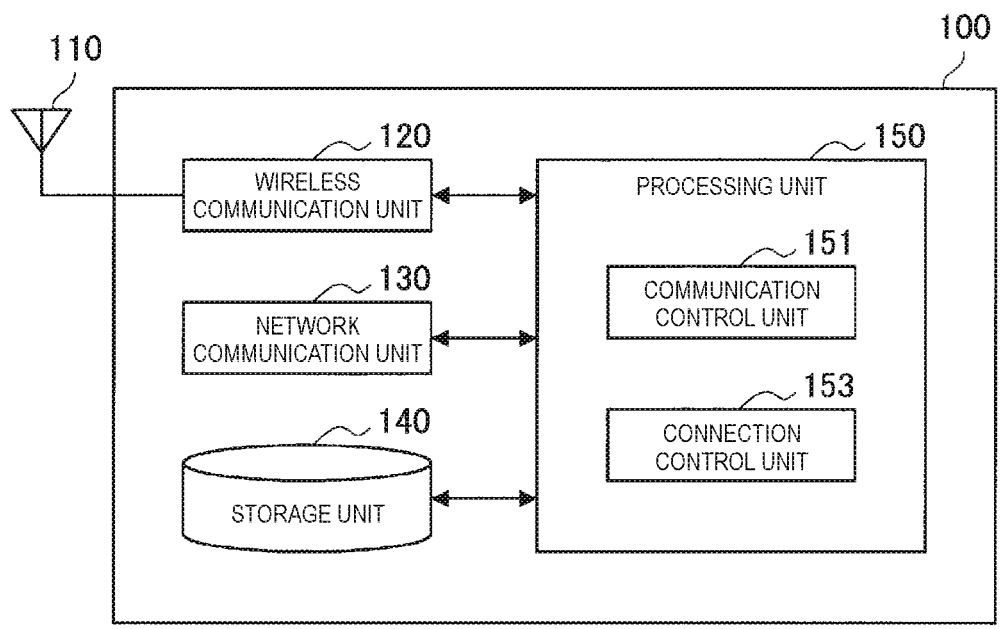
FIG. 4 is a block diagram illustrating an example of a logical configuration of an AP according to an embodiment of the present disclosure.

Moreover, this sequence is disclosed in FIG. 4-4 of "Wi-Fi Display Technical Specification v1.0.0". Refer to the above-mentioned Non-Patent Literature 1 for a detailed description and examples other than this sequence.

2. Exemplary Configuration of Each Device

<2.1. Exemplary Configuration of AP>

FIG. 4 is a block diagram illustrating an example of a logical configuration of the AP 100 according to an embodiment of the present disclosure. As illustrated in FIG. 4, the AP 100 includes an antenna unit 110, a wireless communication unit 120, a network communication unit 130, a storage unit 140, and a processing unit 150.

(Antenna Unit 110)

The antenna unit 110 radiates signals that are output by the wireless communication unit 120 into the space as radio waves. In addition, the antenna unit 110 converts radio waves in the space into signals and outputs the signals to the wireless communication unit 120.

(Wireless Communication Unit 120)

The wireless communication unit 120 transmits and receives signals. In one example, the wireless communication unit 120 receives a signal to the STA 200 or 300 and receives a signal from the STA 200 or 300.

(Network Communication Unit 130)

The network communication unit 130 transmits and receives information. In one example, the network communication unit 130 transmits information to other nodes and receives information from other nodes. An example of the other node includes a router.

(Storage Unit 140)

The storage unit 140 stores programs and data for the operation of the AP 100.

(Processing Unit 150)

The processing unit 150 allows the AP 100 to perform various functions. The processing unit 150 includes a communication control unit 151 and a connection control unit 153. Moreover, the processing unit 150 may further include other components, in addition to these components. In other words, the processing unit 150 can also perform operations other than the operation of these components.

The communication control unit 151 has a function of controlling communication with the STA 200 or the STA 300. The connection control unit 153 has a function of controlling processing for allowing the STA 200 or the STA 300 to be connected to a network, for example, for WPS.

<2.2. Exemplary Configuration of STA>

(1) Exemplary Configuration of STA 200

Figure 5:
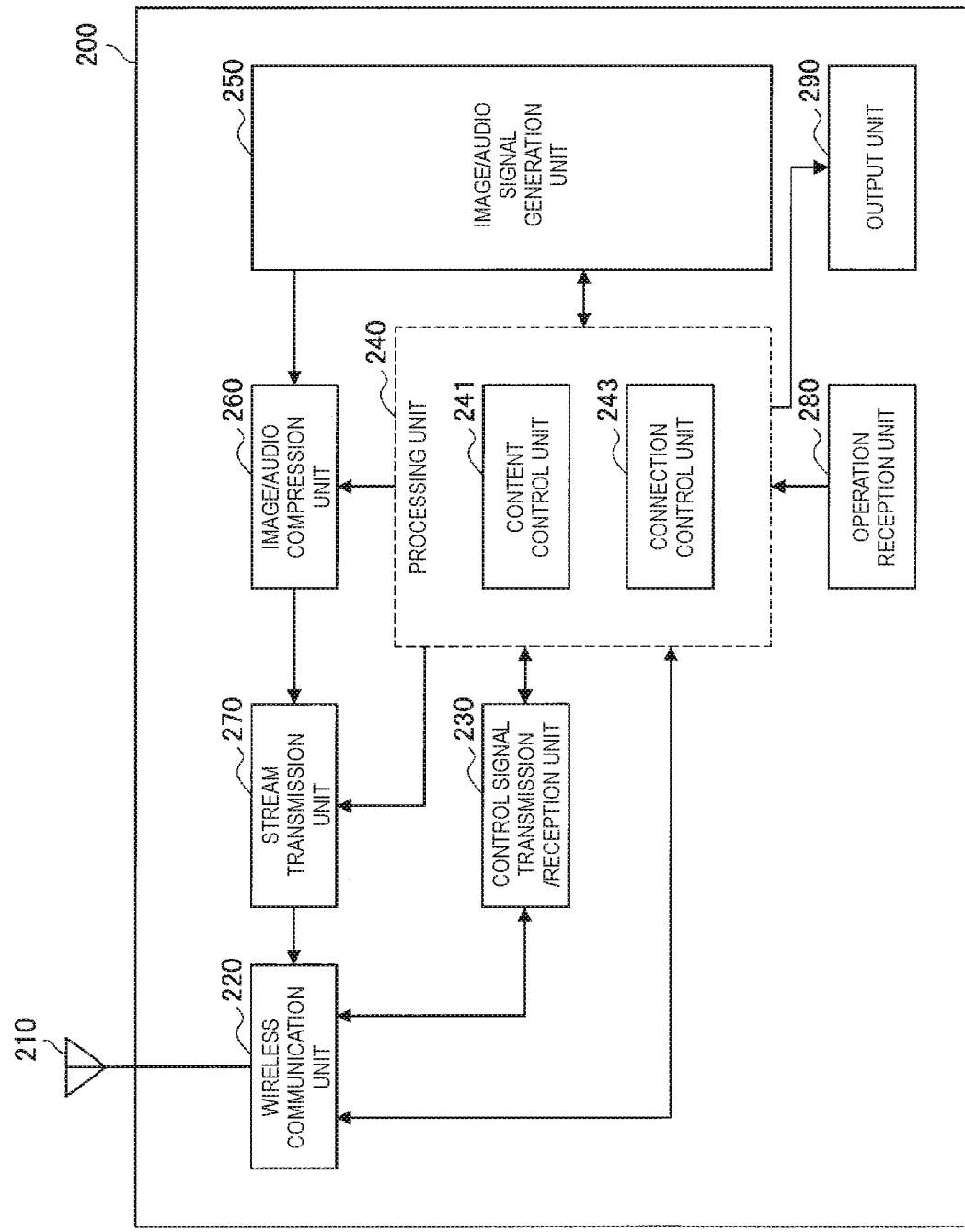
FIG. 5 is a block diagram illustrating an example of a logical configuration of a source device according to an embodiment of the present disclosure.

In one example, the STA 200 is the source device. FIG. 5 is a block diagram illustrating an example of the logical configuration of the source device 200 according to an embodiment of the present disclosure. As illustrated in FIG. 5, the source device includes an antenna unit 210, a wireless communication unit 220, a control signal transmission/reception unit 230, a processing unit 240, an image/audio signal generation unit 250, an image/audio compression unit 260, a stream transmission unit 270, an operation reception unit 280, and an output unit 290.

(Antenna Unit 210)

The antenna unit 210 radiates signals that are output by the wireless communication unit 220 into the space as radio waves. In addition, the antenna unit 210 converts radio waves in the space into signals and outputs the signals to the wireless communication unit 220.

(Wireless Communication Unit 220)

The wireless communication unit 220 has a function of transmission and reception of each piece of information (e.g., image data and audio data) with another information processing device (e.g., the AP 100 or the sink device 300) via the antenna unit 210 using wireless communication under the control of the processing unit 240. In one example, in the case where the processing for transmitting image data is performed, the image data generated by the image/audio signal generation unit 250 is compressed by the image/audio compression unit 260, and the compressed image data (image stream) is transmitted from the antenna unit 210 via the communication unit 220.

Further, the wireless communication unit 220 may be capable of using a plurality of frequency channels. In one example, the wireless communication unit 220 may be capable of simultaneously or selectively using three types of frequency channels of 2.4 GHz, 5 GHz, and 60 GHz. It may be apparent that available frequency channels and their number are not limited to those described above. In the case where the source device 200 is capable of transmitting and receiving a plurality of frequency channels, the sink device 300 can control which frequency channel is used by each source device.

(Control Signal Transmission/Reception Unit 230)

The control signal transmission/reception unit 230 has a function of transmitting or receiving a control signal to or from another information processing device (e.g., the AP 100 or the sink device 300). In one example, the control signal transmission/reception unit 230 acquires a control signal from the information received by the wireless communication unit 220 and outputs the control signal to the processing unit 240. In addition, the control signal transmission/reception unit 230 outputs the control signal that is output from the processing unit 240 to the wireless communication unit 220.

(Processing Unit 240)

The processing unit 240 allows the source device 200 to perform various functions. The processing unit 240 includes a content control unit 241 and a connection control unit 243. Moreover, the processing unit 240 may further include other components, in addition to these components. In other words, the processing unit 240 can also perform operations other than the operation of these components.

—Content Control Unit 241

The content control unit 241 has a function of performing various processing related to the streaming of content from the source device 200 to the sink device 300. In one example, the content control unit 241 controls the image/audio signal generation unit 250 and the image/audio compression unit 260 on the basis of the control signal received by the control signal transmission/reception unit 230. In one example, the content control unit 241 controls the resolution of image data to be transmitted, the image region to be transmitted, the number of channels of audio, or the like. In addition, the content control unit 241 may perform stream transmission control depending on radio wave propagation situation (e.g., link radio wave propagation situation) between the source device 200 and the sink device 300, a transmission speed, the quality of content, or the like.

Further, the content control unit 241 may perform control for improvement of a state where it is difficult to stabilize it by the data rate control. In one example, the content control unit 241 may perform stream transmission control on the basis of capability information of the source device 200 or the sink device 300. The capability information may include, in one example, information as to whether the device is a mobile device, available frequency channel, resolution, transmission control protocol (TCP), and user datagram protocol (UDP), and information indicating whether encryption method is supported, whether standard definition (SD), high definition (HD), or 4K is supported, and whether low power consumption mode is supported.

The information indicating the radio wave propagation situation, the capability information, or the like used for these controls may be included in the control signal and transmitted to and received from the sink device 300.

—Connection Control Unit 243

The connection control unit 243 has a function of controlling the processing for connection with the AP 100 or the sink device 300, for example, for WPS. The specific operation of the connection control unit 243 will be described later in detail.

(Image/Audio Signal Generation Unit 250)

The image/audio signal generation unit 250 has a function of generating data (image data and audio data) to be output and outputting the data to the image/audio compression unit 260 under the control of the processing unit 240. In one example, the image/audio signal generation unit 250 is provided with an imaging unit (not illustrated) and an audio acquisition unit (not illustrated). The imaging unit (e.g., including lens, image sensor, and signal processing circuit) captures a photographic object and generates an image (image data). The audio acquisition unit (e.g., a microphone) acquires surrounding sound at the time of generation of image data by the imaging unit. The data generated in this way is a target to be transmitted to another information processing device (e.g., the sink device 300).

(Image/Audio Compression Unit 260)

The image/audio compression unit 260 has a function of compressing (encoding) the data (image data and audio data) generated by the image/audio signal generation unit 250 and transmitting the compressed data to the stream transmission unit 270 under the control of the processing unit 240. The image/audio compression unit 260 may execute encoding by software or may execute encoding by hardware. The image/audio compression unit 260 is contemplated to function as a codec, but it is assumed to process an uncompressed image or audio. Furthermore, the image/audio compression unit 260 can also function as a scalable codec. Moreover, the scalable codec refers to a codec having flexible adaptability depending on, in one example, the resolution of the information processing device (the sink device) on the reception side and the network environment.

(Stream Transmission Unit 270)

The stream transmission unit 270 has a function of performing transmission processing for transmitting the data (image data and audio data) compressed by the image/audio compression unit 260 as a stream from the antenna unit 210 via the wireless communication unit 220 under the control of the processing unit 240.

(Operation Reception Unit 280)

The operation reception unit 280 has a function of receiving an operation input performed by the user. The operation reception unit 280 may be, in one example, a keyboard, a mouse, a gamepad, a touch panel, a camera, or a microphone. The operation reception unit 280 may be a touch panel formed integrally with a display device. The operation reception unit 280 may receive operation information from an external device such as various sensors or wearable devices.

(Output Unit 290)

The output unit 290 has a function of outputting data generated by the image/audio signal generation unit 250. The output unit 290 may include, in one example, a display device, and an audio output device. The display device can be implemented as, in one example, organic electro luminescence (EL), crystal light emitting diode (LED) display (crystal LED display), or liquid crystal display (LCD). The audio output device can be implemented as, in one example, a speaker. Moreover, it is desirable that the image is output from both the source device 200 and the sink device 300. On the other hand, it is desirable that the sound is output from either the source device 200 or the sink device 300.

(Supplement)

Moreover, the source device 200 may acquire the image data and audio data to be transmitted from an external device. In one example, the source device 200 may acquire the image data and audio data to be transmitted from a web camera equipped with a microphone. The source device 200 may set content (e.g., content composed of image data and audio data) stored in a storage device (e.g., a hard disk) inside or outside the source device 200 as a target to be transmitted. In this case, it is also assumed that the content stored in the storage device is the compressed content. In the case where the content is compressed using the encoding scheme defined by the standard employed in the system 1, the source device 200 may transmit the compressed content as it is without decryption (decoding).

(2) Exemplary Configuration of STA 300

In one example, the STA 300 is the sink device. FIG. 6 is a block diagram illustrating an example of a logical configuration of the sink device 300 according to an embodiment of the present disclosure. As illustrated in FIG. 6, the sink device 300 includes an antenna unit 310, a wireless communication unit 320, a stream reception unit 330, an image/audio decompression unit 340, an image/audio output unit 350, an operation reception unit 360, a processing unit 370, and a control signal transmission/reception unit 380.

(Antenna Unit 310)

The antenna unit 310 radiates signals that are output by the wireless communication unit 320 into the space as radio waves. In addition, the antenna unit 310 converts radio waves in the space into signals and outputs the signals to the wireless communication unit 320.

(Wireless Communication Unit 320)

The wireless communication unit 320 has a function of performing transmission and reception of each piece of information (e.g., image data and audio data) with another information processing device (e.g., the AP 100 or the source device 200) via the antenna unit 310 using wireless communication under the control of the processing unit 370. In one example, in the case where the processing for receiving image data is performed, the image data received by the antenna unit 310 is decompressed (decrypted) by the image/audio decompression unit 340 via the wireless communication unit 320 and the stream reception unit 330. Then, the decompressed image data is supplied to the image/audio output unit 350, and an image corresponding to the decompressed image data is output from the image/audio output unit 350. In other words, the image corresponding to the decompressed image data is displayed on a display unit 351.

Further, the wireless communication unit 320 may be capable of using a plurality of frequency channels. In one example, the wireless communication unit 320 may be capable of simultaneously or selectively using three types of frequency channels of 2.4 GHz, 5 GHz, and 60 GHz. It may be apparent that available frequency channels and their number are not limited to those described above. The processing unit 370 controls which frequency channel among the plurality of frequency channels is used for wireless communication with each source device 200. Moreover, the same frequency channel or different frequency channels may be used for the link between the source device 200 and the sink device 300 and for the link between the AP 100 and the sink device 300.

(Stream Reception Unit 330)

The stream reception unit 330 has a function of receiving information and stream (e.g., image stream or audio stream) to be exchanged with each source device, from among information items received by the wireless communication unit 320 under the control of the processing unit 370. The stream reception unit 330 outputs the received command information to the processing unit 370 and outputs the received stream to the image/audio decompression unit 340 and the processing unit 370.

(Image/Audio Decompression Unit 340)

The image/audio decompression unit 340 has a function of decompressing (decoding) the stream (image data and audio data) transmitted from another information processing device (e.g., the source device 200) and outputting it to the image/audio output unit 350 under the control of the processing unit 370. The image/audio decompression unit 340 may execute decoding by software or may execute decoding by hardware. The image/audio decompression unit 340 is contemplated to function as a codec, but it is assumed to process an uncompressed image or audio. Furthermore, the image/audio decompression unit 340 can also function as a scalable codec.

(Image/Audio Output Unit 350)

The image/audio output unit 350 has a function of outputting data that is decompressed by the image/audio decompression unit 340. The image/audio output unit 350 includes a display unit 351 and an audio output unit 352. The display unit 351 may be implemented as, in one example, an organic EL, a crystal LED display, or LCD. The audio output unit 352 may be implemented as, in one example, a speaker.

(Operation Reception Unit 360)

The operation reception unit 360 has a function of receiving an operation input performed by the user. The operation reception unit 360 may be, in one example, a keyboard, a mouse, a gamepad, a touch panel, a camera, or a microphone. The operation reception unit 360 may be a touch panel formed integrally with the display unit 351. The operation reception unit 360 may receive operation information from an external device such as various sensors or wearable devices.

(Processing Unit 370)

The processing unit 370 allows the sink device 300 to perform various functions. The processing unit 370 includes a content control unit 371 and a connection control unit 373. Moreover, the processing unit 370 may further include other components, in addition to these components. In other words, the processing unit 370 can also perform operations other than the operation of these components.

—Content Control Unit 371

The content control unit 371 performs the stream transmission control on the basis of the control signal transmitted and received by the control signal transmission/reception unit 380. In one example, the content control unit 371 generates a control signal, for each source device 200, used to perform the stream transmission control by the source device 200 (e.g., the content control unit 241) as described above, and causes it to be transmitted to the source device 200 via the control signal transmission/reception unit 380. In addition, the content control unit 371 may set a frequency channel used for transmission of content for each source device 200.

—Connection Control Unit 373

The connection control unit 373 has a function of controlling the processing for connection with the AP 100 or the source device 200, for example, for WPS. The specific operation of the connection control unit 373 will be described later in detail.

(Control Signal Transmission/Reception Unit 380)

The control signal transmission/reception unit 380 has a function of transmitting or receiving a control signal from or to another information processing device (e.g., the AP 100 or the source device 200). In one example, the control signal transmission/reception unit 380 acquires a control signal from the information received by the wireless communication unit 320 and outputs the control signal to the processing unit 370. In addition, the control signal transmission/reception unit 380 outputs the control signal that is output from the processing unit 370 to the wireless communication unit 320.

3. First Embodiment

<3.1. Situation Setting>

The first embodiment discloses technology in a situation where the connection between the STA 200 and the STA 300 is switched from P2P communication to infrastructure communication. Situation setting according to the present embodiment will be described below with reference to FIG. 7.

Figure 7:
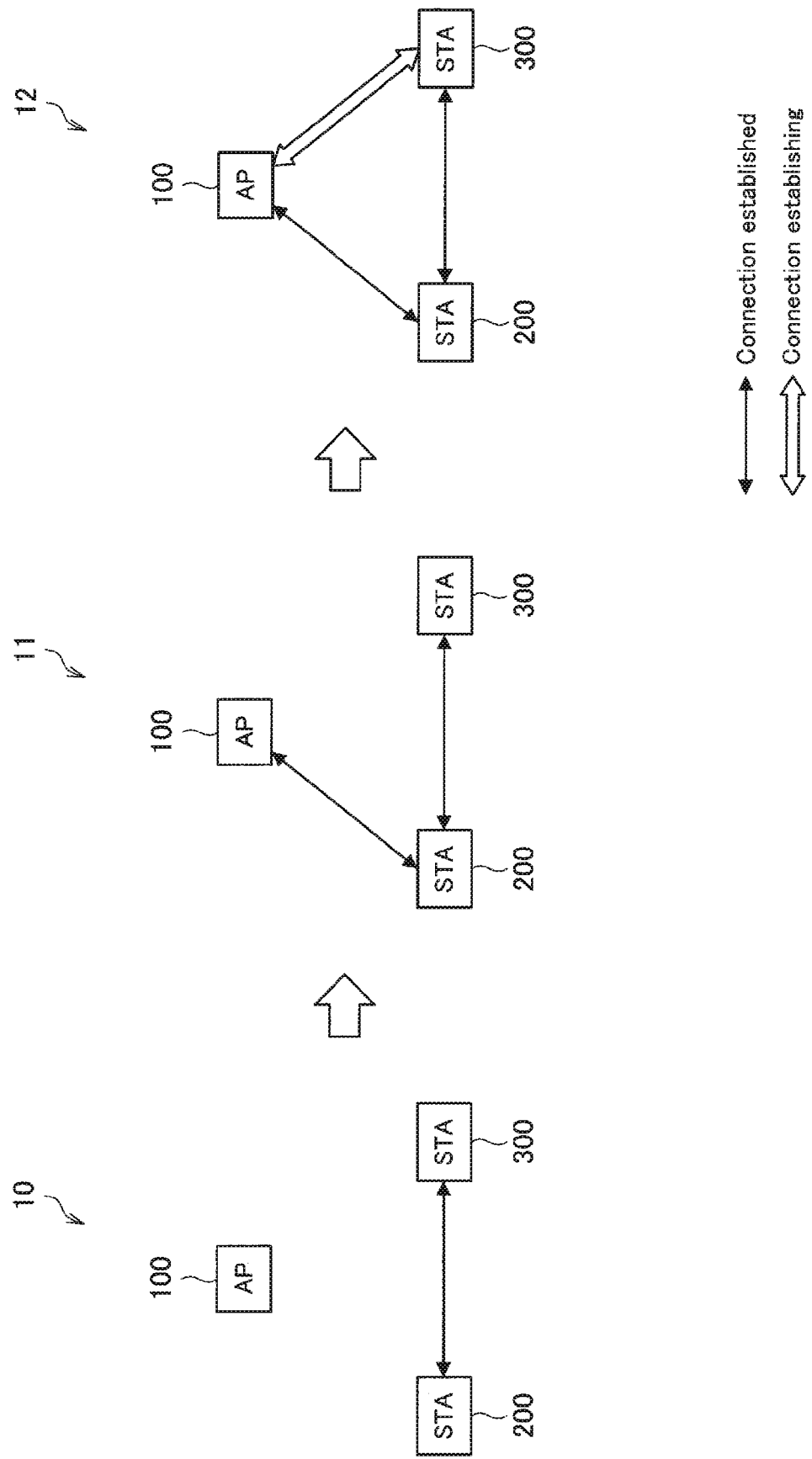
FIG. 7 is a diagram illustrated to describe situation setting according to a first embodiment.

FIG. 7 is a diagram illustrated to describe situation setting according to the present embodiment. As illustrated in FIG. 7, the STA 200 and the STA 300 first establish a connection for P2P communication (reference numeral 10). Then, the STA 200 and the AP 100 establish a connection for infrastructure communication (reference numeral 11), and then the sink device 300 attempts to establish a connection for infrastructure communication with the AP 100 (reference numeral 12). When the connection for infrastructure communication between the AP 100 and the sink device 300 is established, the communication between the STA 200 and the STA 300 can be switched from P2P communication that is direct communication to infrastructure communication that is communication via the AP 100.

<3.2. Technical Problem>

It is assumed that the STA 200 is a registrar and the STA 300 is an enrollee. The connection between devices is typically established on the assumption that a trust relationship is constructed with each other. In other words, a trust relationship is constructed each time the respective connections are established among the P2P communication between the STA 200 and the STA 300, the infrastructure communication between the STA 200 and the AP 100, and the infrastructure communication between the STA 300 and the AP 100. The construction of a trust relationship is however necessary to take a reasonable processing time.

Thus, the present embodiment provides technology for simplifying the step of constructing the trust relationship between the enrollee 300 and the AP 100 while maintaining the security level under the situation indicated by reference numeral 11. Specifically, the present embodiment makes it possible to achieve the simplification while maintaining the security level by using the fact that the construction of trust relationships between the registrar 200 and the enrollee 300 and between the registrar 200 and the AP 100 is completed.

<3.3. Technical Features>

(1) PBC Mode Start Message

The registrar 200 (e.g., the connection control unit 243) notifies the AP 100 of a message used to instruct the AP 100 to establish a connection for infrastructure communication with the enrollee 300. This notification is performed on condition that the connection for P2P communication with enrollee 300 is established, the connection for infrastructure communication with the AP 100 is established or there is a history in which the connection has been established, and the connection for infrastructure communication between the enrollee 300 and the AP 100 is not established. In one example, the registrar 200 notifies the AP 100 of a message used to instruct the AP 100 to establish a connection for infrastructure communication with the enrollee 300 under the condition indicated by reference numeral 11. In addition, for the situation indicated by reference numeral 11, a history in which the connection for infrastructure communication between the registrar 200 and the AP 100 has been established may be used, instead of establishing the connection for infrastructure communication between the registrar 200 and the AP 100. This is because, in either case, that the registrar 200 is capable of holding configuration information for infrastructure communication, which will be described later, as long as the connection has been established even once. Here, this message, which is used to instruct to establish the connection for infrastructure communication with the enrollee 300, may be a message used to instruct that the relevant registrar functions as an external registrar and starts connection processing. In one example, in UPnP, this message may be SetSelectedRegistrar (SR=TRUE, PBC), which instructs that the relevant registrar activates as an external registrar and starts connection processing in the PBC mode. It may be apparent that this message may be implemented as any other message than SetSelectedRegistrar (SR=TRUE, PBC). In addition, the protocol of this message is not limited to UPnP, and, in one example, it may be any protocol such as Bonjour or Avahi. This message is hereinafter also referred to as a PBC mode start message.

In the WSC standard in related art, notification of the PBC mode start message is performed by using depression of a button as a trigger. On the other hand, in the present embodiment, the PBC mode start message is notified automatically under the situation indicated by reference numeral 11. The notification of the PBC mode start message under the situation indicated by reference numeral 11 and the automatic starting of a series of the subsequent connection processing make it possible to reduce time and effort such as depression of a button by the user. In addition, from the viewpoint of the AP 100 or the enrollee 300, the connection processing for using the registrar 200 as the external registrar is executed without any modification to the WSC standard in related art, so the security level disclosed in the WSC standard in related art is ensured.

Moreover, the P2P communication may be, in one example, Wi-Fi Direct or neighborhood area network (NAN) compliant communication. In addition, the infrastructure communication may be Wi-Fi compliant communication. It may be apparent that they are mere examples and may be communication compliant to any other communication standards. Moreover, the description will be given on the assumption that Wi-Fi Direct is used for P2P communication. One of the STA 200 and the STA 300 functions as a group owner and the other functions as a client.

(2) Connection Acceptance Request Message

The registrar 200 (e.g., the connection control unit 243) may notify the AP 100 of a message requesting preferential acceptance of a connection request from the enrollee 300. This message may be notified using, in one example, an L4 message. This message is also referred to as a connection acceptance request message, hereinafter. The preferential acceptance of a connection request includes, in one example, preferentially receiving a probe request and replying a probe response.

The connection acceptance request message includes information for identifying the enrollee 300 (e.g., a MAC address). This information allows the AP 100 to identify the enrollee 300 and to accept preferentially the connection request. Specifically, the AP 100 (the connection control unit 153) identifies the probe request notified from the enrollee 300 among the notified one or more probe requests, by using the information for identifying the enrollee 300, which is notified from the registrar 200. This identification can be achieved, in one example, by filtering the MAC address. Such identification allows the AP 100 to accept connection acceptance only with the enrollee 300 instructed from the registrar 200, thereby ensuring the security. Moreover, the connection acceptance request message can be omitted. This is because the connection acceptance request message is intended for the purpose of double-checking for knowing in advance that the AP 100 receives the probe request from the enrollee 300 to make the connection processing faster and safer (e.g., to prevent a third party from entering).

Moreover, as described above with reference to FIG. 2, the MAC address of the enrollee may be set in the existing SetSelectedRegistrar. The present embodiment may be similarly applicable to this. In other words, the connection acceptance request message may be included in the PBC mode start message.

(3) Beacon

The AP 100 (e.g., the connection control unit 153) starts processing for establishing a connection for infrastructure communication with the enrollee 300 by using, as a trigger, the notification of the PBC mode start message from the registrar 200 in which the connection for infrastructure communication with the AP 100 is established and the connection for P2P communication with the enrollee 300 is established.

Specifically, the AP 100 (e.g., the connection control unit 153) notifies the enrollee 300 of a message instructing to start the connection for infrastructure communication. In one example, as a first example, the AP 100 may broadcast a beacon (or a probe response) including information indicating that the AP 100 is operating in the push button configuration (PBC) mode. In addition, as a second example, the AP 100 may broadcast a beacon (or a probe response) including information instructing to switch from P2P communication to infrastructure communication. In addition, these beacons may include the MAC address of the enrollee 300, which is registered in the connection acceptance request message. Such a beacon is hereinafter also referred to as an infrastructure communication connection start instruction beacon. It is possible for the enrollee 300 to recognize the start of the PBC mode by the infrastructure communication connection start instruction beacon and to start the connection with the AP 100 by using this beacon as a trigger. Thus, it is possible to reduce time and effort such as depression of a button for PBC by the user.

The information stored in the WSC IE of the infrastructure communication connection start instruction beacon will be described below in detail. Table 1 below is a list of attributes of the WSC IE of the beacon frame listed in Table 3 of Non-Patent Literature 1.

TABLE 1

| Attribute | R/O/C | Allowed Values |
| --- | --- | --- |
| Version | R | Deprecated. Always set to 0x10 for backwards compatibility. See Version2 for current version negotiation mechanism. |
| Wi-Fi Simple Configuration State | R | 0x01 (Not Configured), 0x02 (Configured). |
| AP Setup Locked | C | Shall be included if value is TRUE. |
| Selected Registrar | C | Indicates if the user has recently activated a Registrar to add an Enrollee. If Selected Registrar is TRUE, then the Selected Registrar attribute SHALL be included. |
| Device Password ID | C | Device Password ID indicates the method or identifies the specific password that the selected Registrar intends to use. If any of the active registrars are in PBC mode this value shall be 0x0004 (Pushbutton). Note that WSC 1.0 devices may use other values. If Selected Registrar is TRUE, then the Device Password ID attribute SHALL be included. |
| Selected Registrar Configuration Methods | C | This attribute contains the Configuration methods active on all of the selected Registrars. This attribute shall be the union of the Selected Registrar Configuration Methods from all active registrars (internal and external). If Selected Registrar is TRUE, then the Selected Registrar Configuration Methods attribute SHALL be included. |

TABLE 1-continued

| Attribute | R/O/C | Allowed Values |
| --- | --- | --- |
| UUID-E | C | The AP's UUID shall be provided when the AP is a dual-band AP in push button mode and indicating push button mode on both radios. |
| RF Bands | C | Indicates all RF bands available on the AP. A dual-band AP shall provide this attribute. |
| Version2 (inside WFA Vendor Extension) | C | 0x20 = version 2.0, 0x21 = version 2.1, etc. Shall be included in protocol version 2.0 and higher. |
| AuthorizedMACs (inside WFA Vendor Extension) | C | List of enrollee MAC addresses that have been registered to start WSC. The AP includes this field in beacons so enrollees can tell if they have been registered to start WSC. There may be multiple enrollees active on the network, but not all of them have been registered to start WSC. This element allows an enrollee to detect if they should start WSC or not. The AP shall include this attribute if any of the Registrars provides a list of authorized MAC addresses. |
| Registrar Configuration Methods (inside WFA Vendor Extension) | C | The Configuration Methods supported by the internal Registrar of the AP. If the AP is an NFC Device then the Registrar Configuration Methods subelement SHALL be included, otherwise it MAY be included. |
| <other . . . > | O | Multiple attributes are permitted. |

First, in the infrastructure communication connection start instruction beacon, TRUE is registered in "Selected Registrar". This allows the fact that the registrar is activated to add an enrollee to a network to be notified. In addition, in the infrastructure communication connection start instruction beacon, the MAC address of the enrollee 300 is registered in "AuthorizedMACs". In addition, in the first example, information indicating that it is in the PBC mode is registered in "Registrar Configuration Methods" in the infrastructure communication connection start instruction beacon. In this case, the infrastructure communication connection start instruction beacon is similar to the beacon that is broadcast in step S13 in the sequence described above with reference to FIG. 2. On the other hand, in the second example, information indicating a registrar configuration method for switching from P2P communication to infrastructure communication is registered in "Registrar Configuration Methods" in the infrastructure communication connection start instruction beacon. In other words, in the second example, new information not included in the existing standard is defined.

(4) Connection Start Request Message

The registrar 200 (e.g., the connection control unit 243) notifies the enrollee 300 of the message, which instructs to establish the connection for infrastructure communication with the AP 100, using P2P communication. This message may be notified using, in one example, an L4 message. This message is hereinafter also referred to as a connection start request message. The use of the connection start request message makes it possible for the registrar 200 to control the timing at which the enrollee 300 is connected.

The enrollee 300 (e.g., the connection control unit 373) can display information related on the connection for infrastructure communication by using reception of the connection start request message as a trigger. Specifically, the enrollee 300 displays information indicating the connection with the registrar 200 via the AP 100. In this event, the enrollee 300 may determine whether to establish the connection for infrastructure communication depending on the user operation for the information display. In one example, the enrollee 300 pops up an option as to whether to connect with the registrar 200 via the AP 100 and receives a user instruction. This makes it possible to prevent the connection switching that is undesired by the user.

(5) Configuration Information for Infrastructure Communication

The registrar 200 (e.g., the connection control unit 243) may notify the enrollee 300 of the configuration information for connection with the AP 100 using P2P communication. This information is hereinafter also referred to as configuration information for infrastructure communication. The configuration information for infrastructure communication may include at least one of a service set identifier (SSID), basic service set identifier (BSSID), media access control (MAC) address, port information, or device name (DevName) of the AP 100. It is possible for the enrollee 300 to simplify the processing for the connection to the AP 100 by referring to the configuration information for infrastructure communication.

The registrar 200 (e.g., the connection control unit 243) may notify the AP 100 of a message requesting acceptance to notify the enrollee 300 of the configuration information for infrastructure communication. Then, the AP 100 (e.g., the connection control unit 153) notifies the registrar 200 of a message indicating whether to accept notification of the configuration information for infrastructure communication used for connection with the AP 100 using the infrastructure communication to the enrollee 300. The registrar 200 notifies the enrollee 300 of the configuration information for infrastructure communication only upon reception of the acceptance from the AP 100. Such a mechanism makes it possible to incorporate appropriately the connection policy of the AP 100 even in the simplified connection processing. In addition, the AP 100 (e.g., the connection control unit 153) may notify the registrar 200 of a message indicating whether to accept concurrent connection for the infrastructure communication between the AP 100 and the registrar 200 and for the P2P communication between the registrar 200 and the enrollee 300. Then, the registrar 200 does not disconnect the connection for P2P communication in the case where the acceptance is received but disconnects the P2P communication in the case where the acceptance is not received, and performs processing for connection between the AP 100 and the enrollee 300. Such a mechanism makes it possible to incorporate appropriately the connection policy of the AP 100 even in the simplified connection processing.

The registrar 200 establishes the connection for P2P communication, and then establishes a TCP connection or RTSP connection link with the enrollee 300 and notifies the configuration information for infrastructure communication. The packet format for notification of the configuration information for infrastructure communication can be variously considered as examples given below.

P2P IE (Information Element)

WFD IE

IE for ASP (Application Service Platform) (e.g., a new format may be created using format command of ASP2.0)

Packets specified in UPnP standard protocol

In one example, in the process of the exchange using any one of these formats, the enrollee 300 can acquire associated frequency information between the AP 100 and the registrar 200 and concurrent information on the wireless line of the registrar 200. This makes it possible for the enrollee 300 to determine the optimum frequency channel that is necessary to be used. In addition, the enrollee 300 can determine whether the infrastructure communication and the P2P communication are to be executed in parallel or whether the P2P communication is to be disconnected at the time of switching. Moreover, the concurrent information is information indicating whether connection forms including time division connection of the same frequency channel, time division connection of different frequency channels, concurrent connection of the same frequency channel, and concurrent connection of different frequency channels are available.

The exchange of the associated frequency information and the concurrent information may be performed as a part of the processing of Device Discovery or Service Discovery or may be performed after notification of configuration information for infrastructure communication. The exchange of the associated frequency information and concurrent information may not be performed necessarily. Furthermore, at the start of exchanging the associated frequency information and concurrent information, the registrar 200 and the enrollee 300 may negotiate which information is exchangeable and which means of exchange is used.

Moreover, as a modified example, the registrar 200 may notify the enrollee 300 of the configuration information for infrastructure communication via the AP 100 before establishing the connection for P2P communication. In addition, the enrollee 300 may play a leading role in notifying the configuration information for infrastructure communication. Furthermore, the exchange of commands by UPnP is assumed to be performed on the basis of the format. In addition, regardless of the above-described processing, in one example, it is assumed that the frequency during P2P connection is registered in the probe request from the enrollee 300 to the AP 100, and the P2P communication and the infrastructure communication may be performed on the same frequency channel. Such a method is usable in the case where the registrar 200 or the enrollee 300 has only the time division concurrent function.

<3.4. Processing Procedure>

The procedure of processing according to the present embodiment will be described below with reference to FIG. 8 to FIG. 14. The procedure of each individual processing of the registrar 200 and the enrollee 300 is described, and then the processing procedure in the entire system 1 is described.

(1) Processing of Registrar

Figure 8:
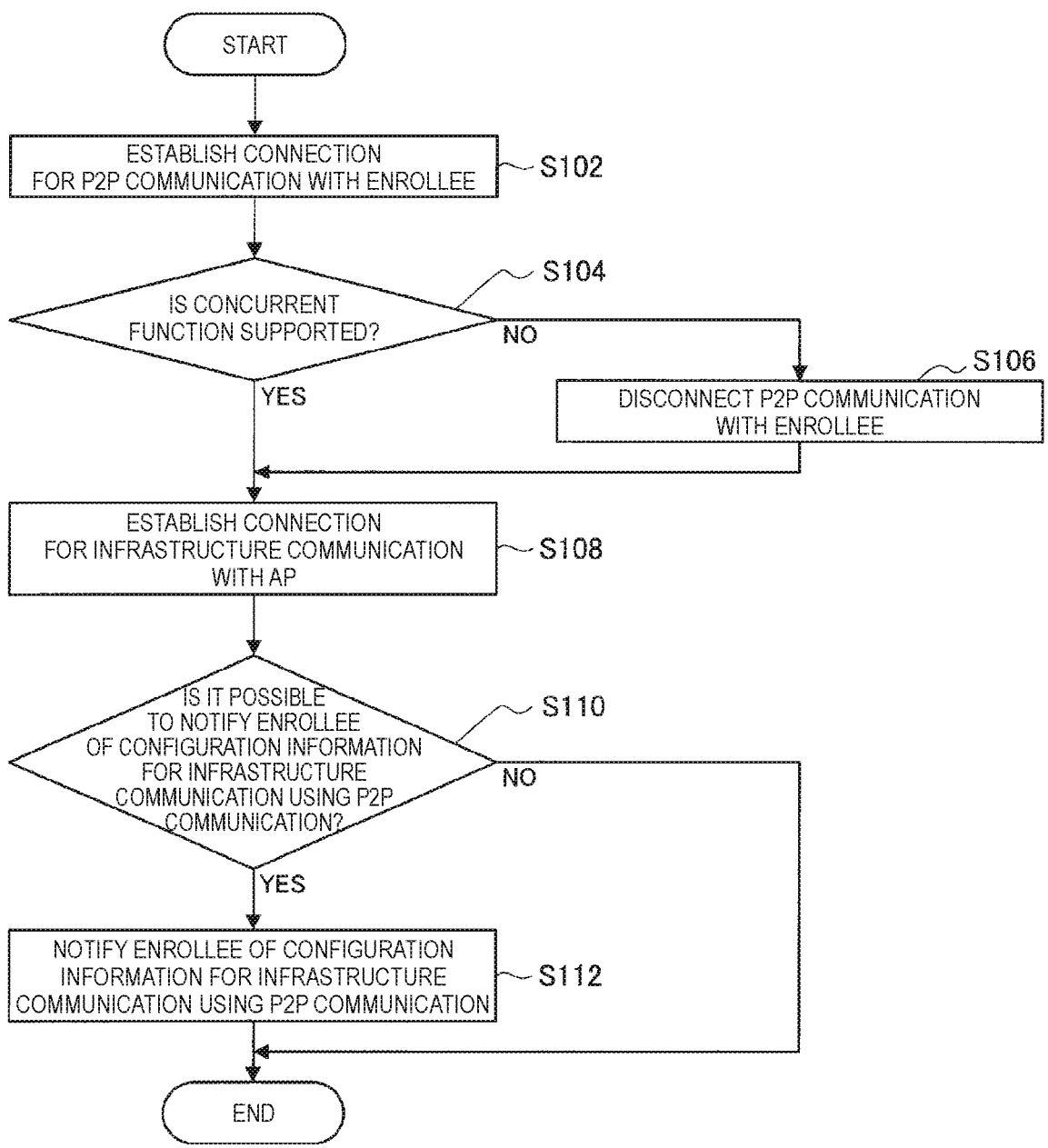
FIG. 8 is a flowchart illustrating an example of a procedure of connection switching processing executed in a registrar according to the present embodiment.

FIG. 8 is a flowchart illustrating an example of the procedure of the connection switching processing executed in the registrar 200 according to the present embodiment.

As illustrated in FIG. 8, the registrar 200 first establishes a connection for P2P communication with the enrollee 300 (step S102). Next, the registrar 200 determines whether the registrar 200 and the enrollee 300 can support the concurrent function (step S104). Only in the case where any one of them is determined not to support it (NO in step S104), the registrar 200 disconnects the P2P communication with the enrollee 300 (step S106). Next, the registrar 200 establishes a connection for infrastructure communication with the AP 100 (step S108). Next, the registrar 200 determines whether it is possible to notify the enrollee 300 of configuration information for infrastructure communication using P2P communication (i.e., whether acceptance from the AP 100 is received) (step S110). Only in the case where the notification is possible (YES in step S110), the registrar 200 notifies the enrollee 300 of the configuration information for infrastructure communication using P2P communication (step S112).

Moreover, in step S106, in the case where the registrar 200 stores previously the configuration information for infrastructure communication with the AP 100 (e.g., a case where connection information having a history in which it has been connected previously with the AP 100 remains), the registrar 200 is assumed to notify the configuration information for infrastructure communication before disconnecting the P2P connection. In the case where the concurrent function is not supported in step S104, the result in step S110 is typically also NO and notification of configuration information for infrastructure communication in step S112 is not performed. On the other hand, the notification at the time of step S106 allows the enrollee 300 to use the infrastructure communication configuration, which is similar to the case where the step S112 is executed.

(2) Processing of Enrollee

Figure 9:
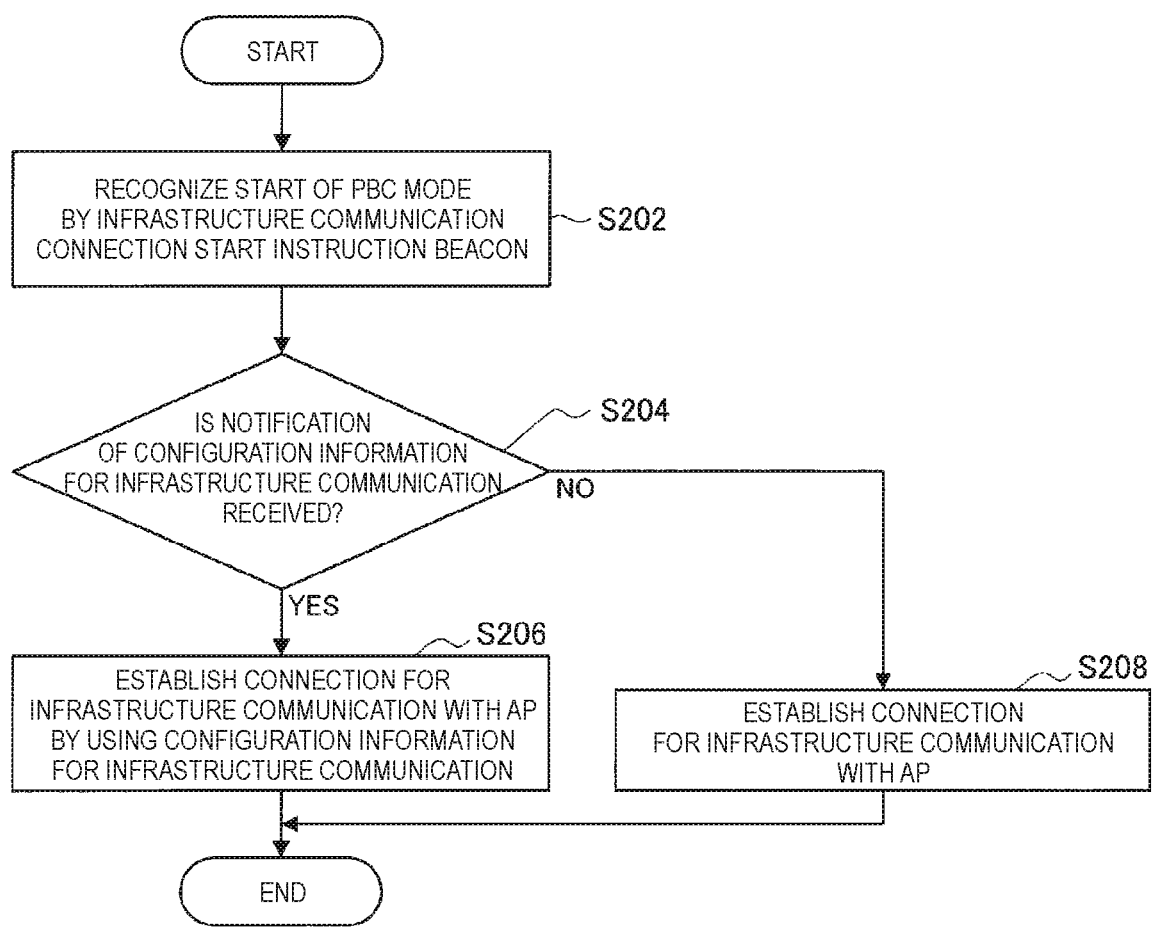
FIG. 9 is a flowchart illustrating an example of a procedure of connection switching processing executed in a registrar according to the present embodiment.

FIG. 9 is a flowchart illustrating an example of the procedure of the connection switching processing executed in the registrar 200 according to the present embodiment.

As illustrated in FIG. 9, the enrollee 300 recognizes the start of the PBC mode by receiving the infrastructure communication connection start instruction beacon (step S202). Next, the enrollee 300 determines whether notification of configuration information for infrastructure communication is received (step S204). In the case where the notification is received (YES in step S204), the enrollee 300 establishes a connection for infrastructure communication with the AP 100 using the configuration information for infrastructure communication (step S206). In the case where the notification is not received (NO in step S204), the enrollee 300 establishes a connection for infrastructure communication with the AP 100 without using the configuration information for infrastructure communication (step S208). Moreover, in the case where the result of step S204 is YES, the enrollee 300 may omit step S202 and may transmit a probe request before receiving a beacon from the AP 100.

(3) Processing of Entire System (First Example)

Figure 10:
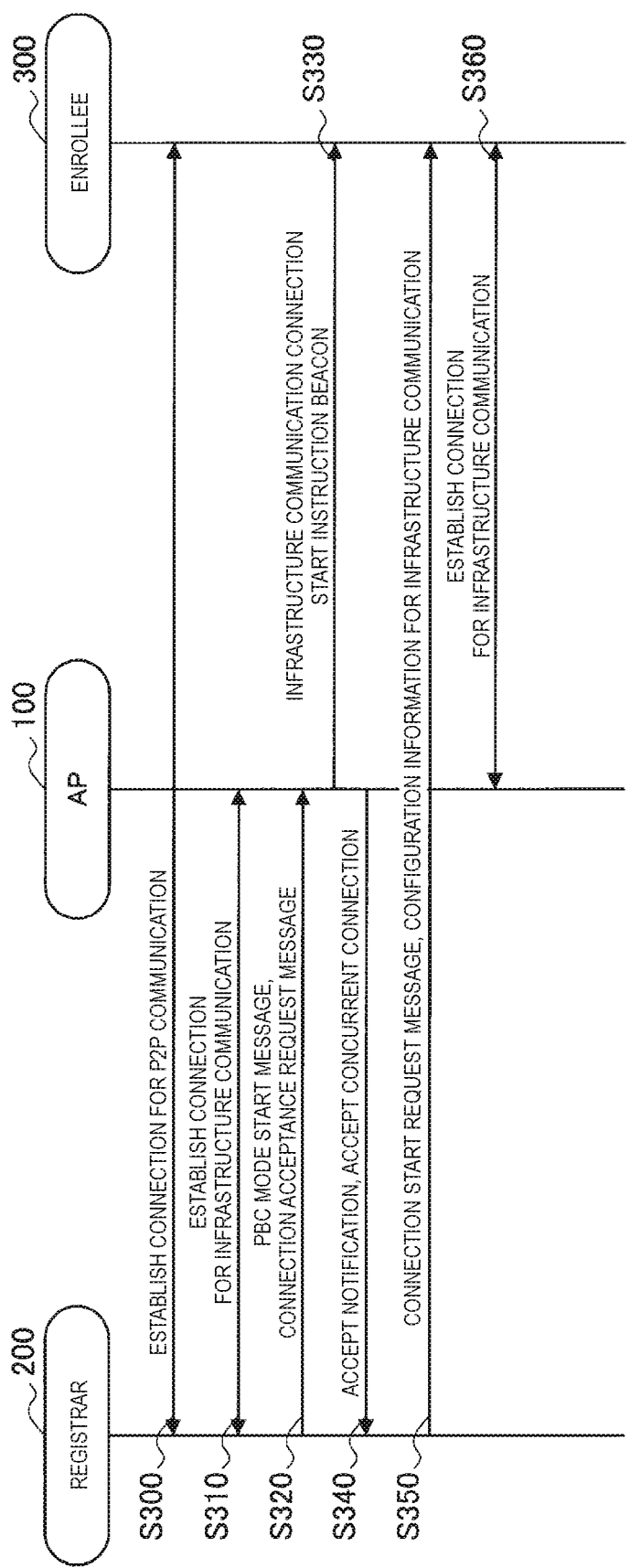
FIG. 10 is a sequence diagram illustrating an example of a procedure of connection switching processing executed in the system according to the present embodiment.

FIG. 10 is a sequence diagram illustrating an example of the procedure of the connection switching processing executed in the system 1 according to the present embodiment. This sequence involves the AP 100, the registrar 200, and the enrollee 300. This sequence is an example in a case where the notification of configuration information for infrastructure communication is accepted and the concurrent connection for infrastructure communication and P2P communication is accepted.

As illustrated in FIG. 10, the registrar 200 and the enrollee 300 first establish a connection for P2P communication (step S300). Next, the registrar 200 establishes a connection for infrastructure communication with the AP 100 (step S310). Next, the registrar 200 notifies the AP 100 of the PBC mode start message and the connection acceptance request message (step S320). Next, the AP 100 broadcasts the infrastructure communication connection start instruction beacon (step S330). In addition, the AP 100 notifies the registrar 200 of a message indicating that the notification of configuration information for infrastructure communication is accepted and the concurrent connection is accepted (step S340). Next, the registrar 200 notifies the enrollee 300 of the connection start request message and the configuration information for infrastructure communication (step S350). Next, the enrollee 300 establishes a connection for infrastructure communication with the AP 100 using the configuration information for infrastructure communication (step S360).

Figure 11:
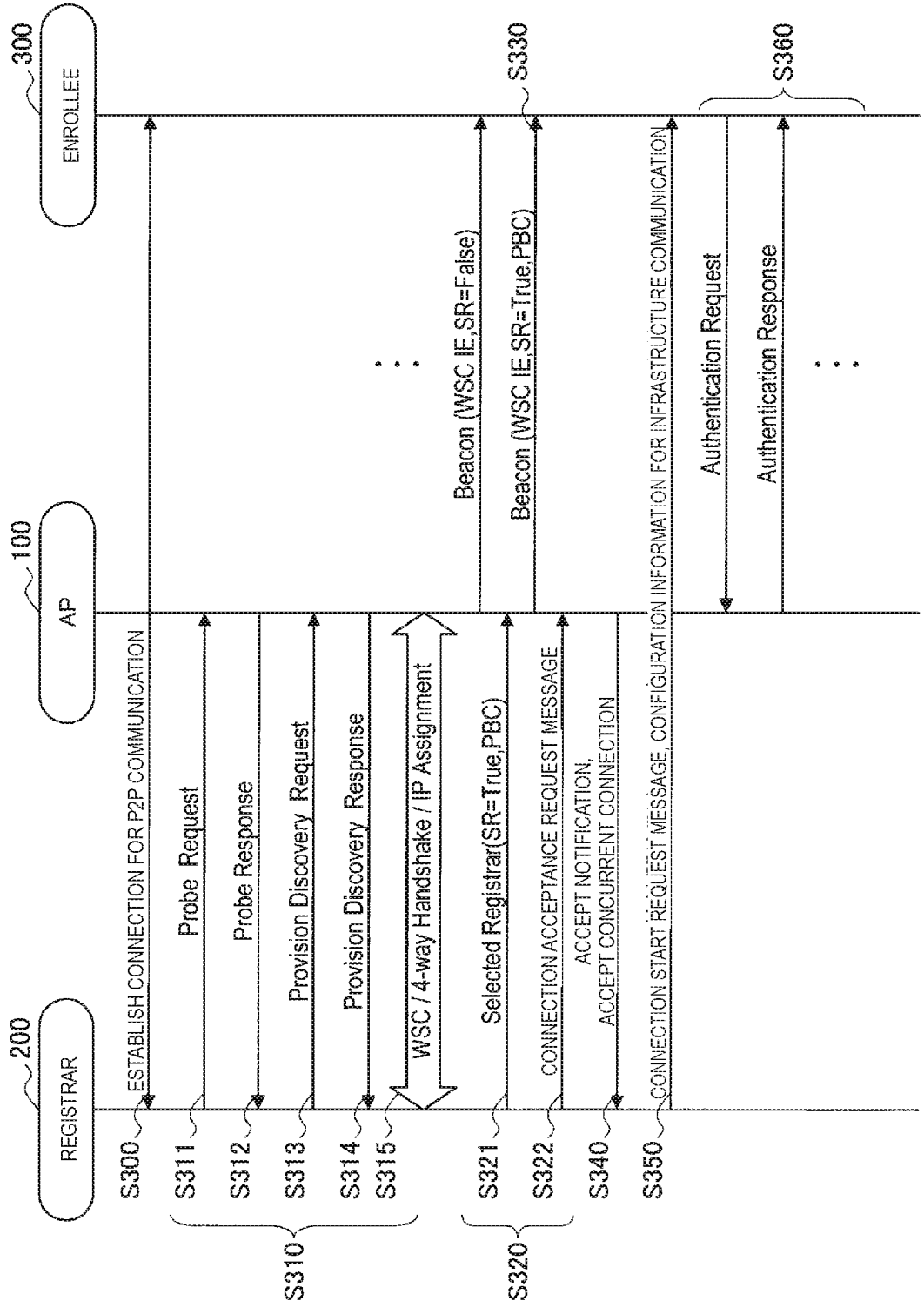
FIG. 11 is a sequence diagram illustrating in detail the procedure of the processing illustrated in FIG. 10.

The procedure of the processing described above with reference to FIG. 10 will be described in more detail below with reference to FIG. 11. FIG. 11 is a sequence diagram illustrating in detail the processing procedure illustrated in FIG. 10. Moreover, the beacon from the AP 100 is a broadcast signal, and so both the registrar 200 and the enrollee 300 are receiving it. In the following description, a description of processing irrelevant to the features of the present embodiment will be omitted for convenience purpose.

The processing in step S310 will be first described in detail. The registrar 200 transmits a probe request to the AP 100 (step S311) in a state where the beacon is previously received from the AP 100 (omitted in FIG. 11), and receives a probe response from the AP 100 (step S312). Next, the registrar 200 transmits a provision discovery request to the AP 100 (step S313) and receives a provision discovery response from the AP 100 (step S314). Next, the registrar 200 performs the WSC process, 4-way handshake process, and IP assignment process with the AP 100.

Then, the processing in step S320 will be described. The registrar 200 notifies the AP 100 of SetSelectedRegistrar (SR=TRUE, PBC) (step S321). This message corresponds to the PBC mode start message. Next, the registrar 200 notifies the AP 100 of the connection acceptance request message (step S322).

Then, the processing in step S330 will be described. The AP 100 is set to SR (Selected Registrar)=False in the initial state, and broadcasts the beacon in which SR=False is set. However, the AP 100 changes its state to SR=TRUE by using the notification of the PBC mode start message as a trigger. Then, the AP 100 broadcasts the beacon in which information indicating that it is in the PBC mode is registered in "Registrar Configuration Methods" in which SR=TRUE is registered (step S330).

Then, the processing in step S360 will be described. Here, the processing similar to that of step S15 and the subsequent steps described above with reference to FIG. 2 is performed. Specifically, the enrollee 300 sets "Registrar Configuration Methods" to the PBC mode and starts the exchange with the registrar 200 via the AP 100 (e.g., by using tunnel processing of packet). Specifically, the WSC processing is started from the transmission of the M1 message as specified in the WSC. The M1 message is intended to notify the registrar 200, which is an external registrar, that the UPnP event is accepted. The registrar 200 and the enrollee 300 perform the exchange of messages M1 to M8 using UPnP. The enrollee 300 recognizes the credential included in the registrar 200 upon receipt of the M8 message. Finally, the registrar 200 notifies SetSelectedRegistrar (SR=FALSE) to change the state of the AP 100 to SR (Selected Registrar)=False. Moreover, the WSC processing described above is performed for each device. In addition, for the WSC processing described above, it is desirable that the AP 100 supports the tunnel processing.

(4) Processing of Entire System (Second Example)

Figure 12:
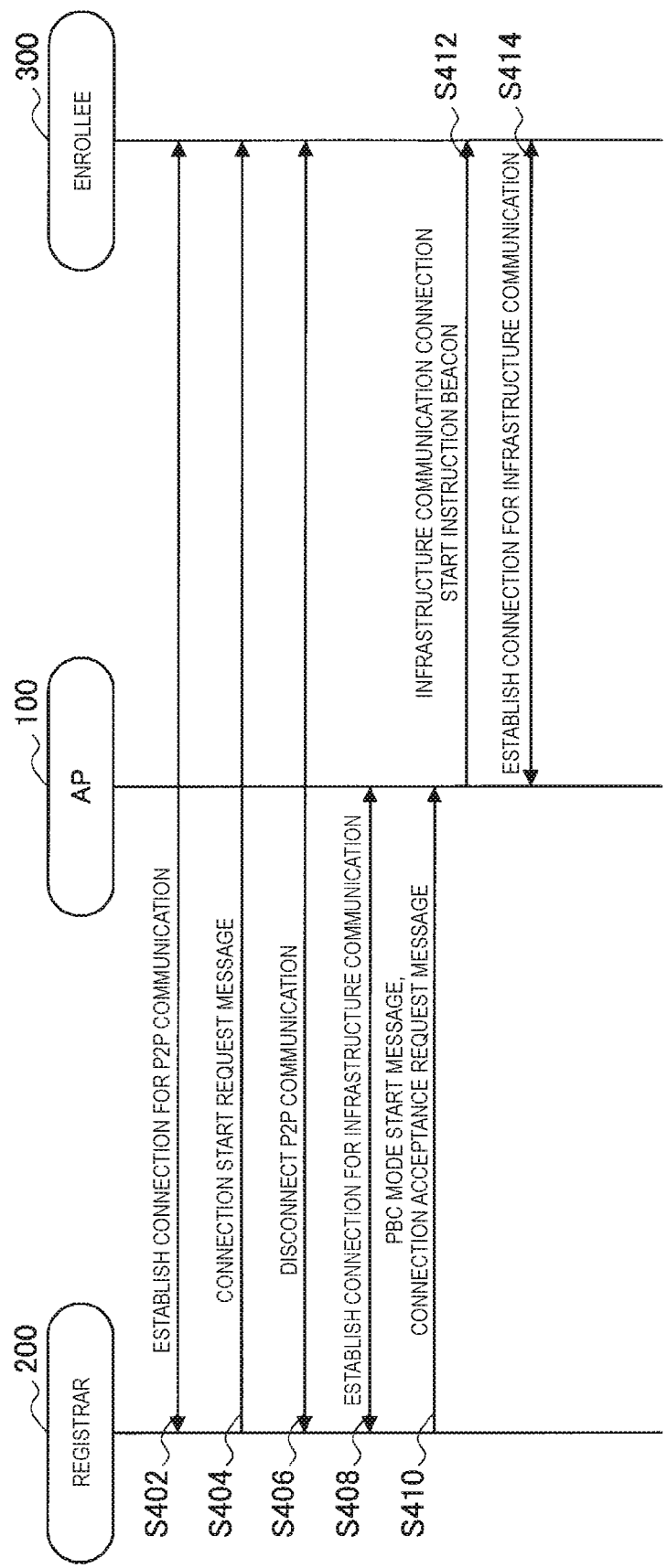
FIG. 12 is a sequence diagram illustrating an example of a procedure of connection switching processing executed in the system according to the present embodiment.
Figure 13:
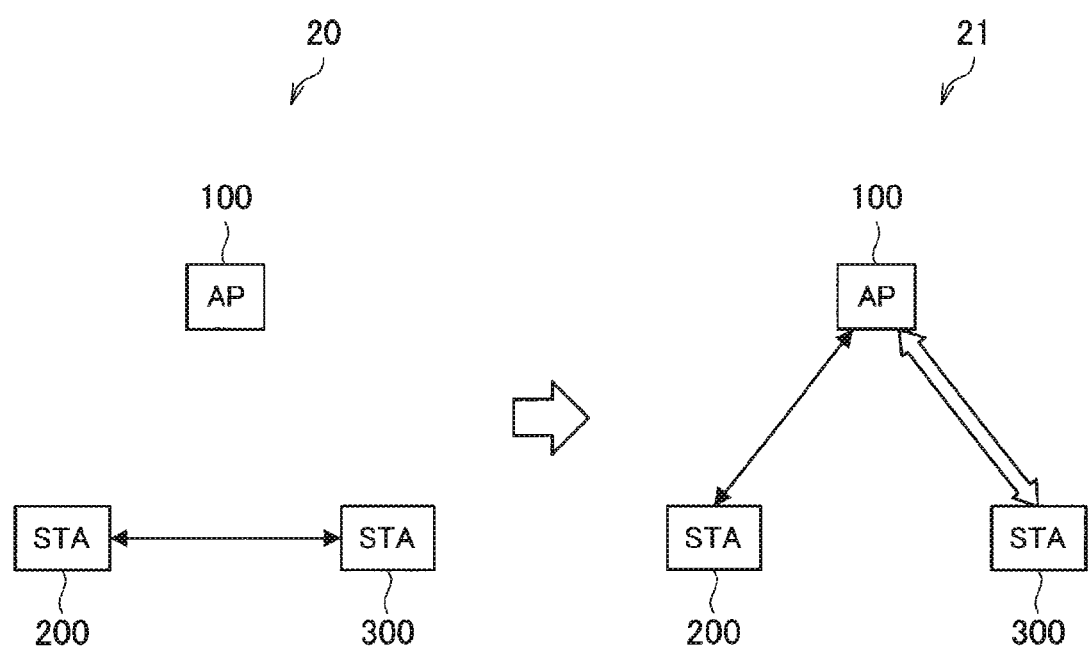
FIG. 13 is a diagram illustrated to describe a change in topology in the sequence illustrated in FIG. 12.

FIG. 12 is a sequence diagram illustrating an example of the procedure of the connection switching processing executed in the system 1 according to the present embodiment. This sequence involves the AP 100, the registrar 200, and the enrollee 300. This sequence is an example of the case where the registrar 200 or the enrollee 300 does not support the concurrent function. FIG. 13 is a diagram illustrated to describe a change in topology in the sequence illustrated in FIG. 12. As illustrated in FIG. 13, in this sequence, the registrar 200 and the enrollee 300 establish a connection for P2P communication (reference numeral 20). Next, the registrar 200 disconnects the P2P communication and establishes the connection for infrastructure communication with the AP 100, then the enrollee 300 attempts to establish a connection for the infrastructure communication with the AP 100 (reference numeral 22).

As illustrated in FIG. 12, the registrar 200 and the enrollee 300 first establish a connection for P2P communication (step S402). Next, the registrar 200 notifies the enrollee 300 of the connection start request message (step S404). Next, the registrar 200 disconnects the P2P communication with the enrollee 300 (step S406). Next, the registrar 200 establishes a connection for infrastructure communication with the AP 100 (step S408). Next, the registrar 200 notifies the AP 100 of the PBC mode start message and the connection acceptance request message (step S410). Next, the AP 100 broadcasts the infrastructure communication connection start instruction beacon (step S412). Then, the enrollee 300 establishes the connection for infrastructure communication with the AP 100 without using the configuration information for infrastructure communication (step S414).

(5) Processing of Entire System (Third Example)

Figure 14:
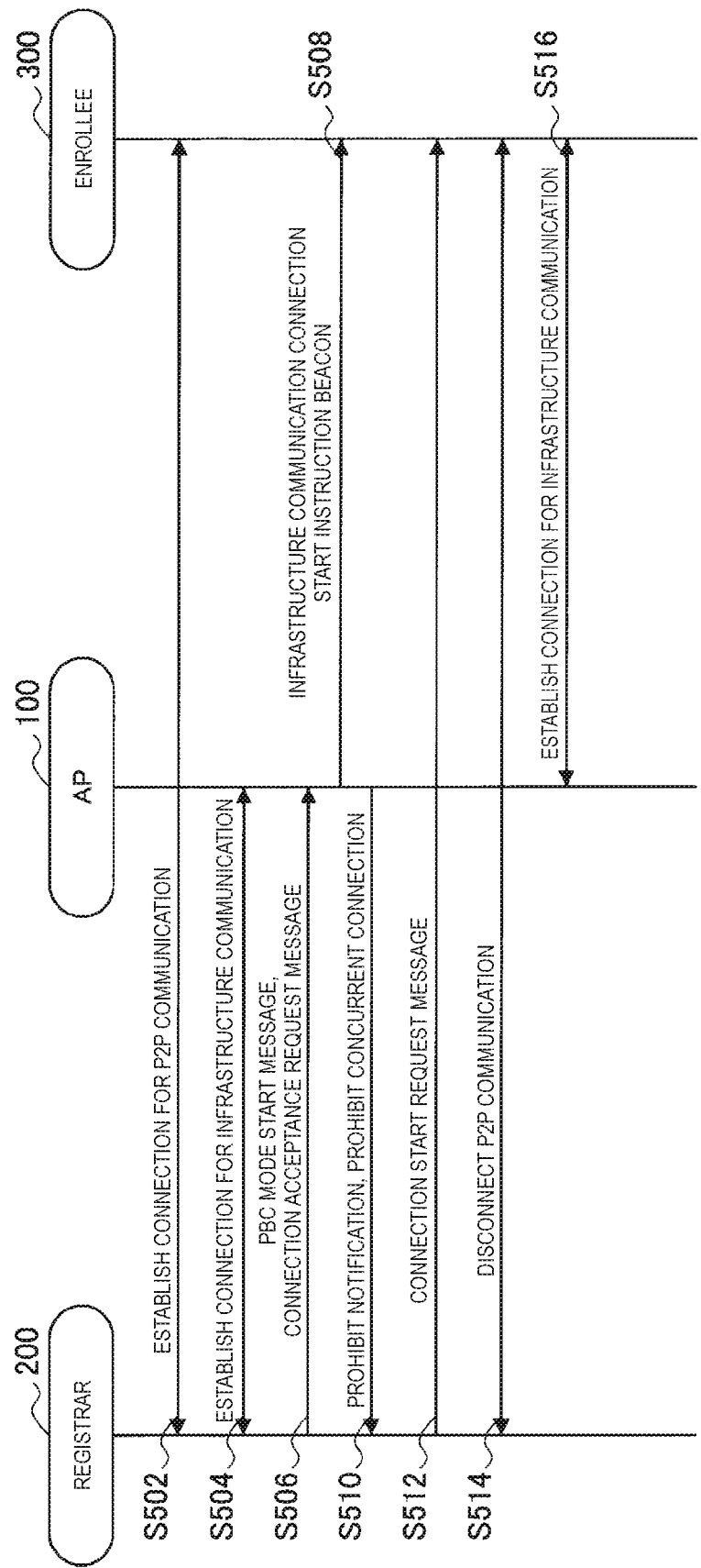
FIG. 14 is a sequence diagram illustrating an example of a procedure of connection switching processing executed in the system according to the present embodiment.

FIG. 14 is a sequence diagram illustrating an example of the procedure of the connection switching processing executed in the system 1 according to the present embodiment. This sequence involves the AP 100, the registrar 200, and the enrollee 300. This sequence is an example of the case where notification of configuration information for infrastructure communication is prohibited and concurrent connection for infrastructure communication and P2P communication is prohibited.

As illustrated in FIG. 14, the registrar 200 and the enrollee 300 first establish a connection for P2P communication (step S502). Next, the registrar 200 establishes a connection for infrastructure communication with the AP 100 (step S504). Next, the registrar 200 notifies the AP 100 of the PBC mode start message and the connection acceptance request message (step S506). Next, the AP 100 broadcasts the infrastructure communication connection start instruction beacon (step S508). In addition, the AP 100 notifies the registrar 200 of a message indicating that the configuration information for infrastructure communication is prohibited and the concurrent connection is prohibited (step S510). Upon reception of this prohibition message, the registrar 200 notifies the enrollee 300 of the connection start request message (step S512), and disconnects the P2P communication with the enrollee 300 (step S514). Then, the enrollee 300 establishes the connection for infrastructure communication with the AP 100 without using the configuration information for infrastructure communication (step S516).

4. Second Embodiment

<4.1. Situation Setting>

The second embodiment discloses technology in a situation where the connection between the STA 200 and the STA 300 is switched from the infrastructure communication to the P2P communication is disclosed. Situation setting according to the present embodiment will be described below with reference to FIG. 15.

Figure 15:
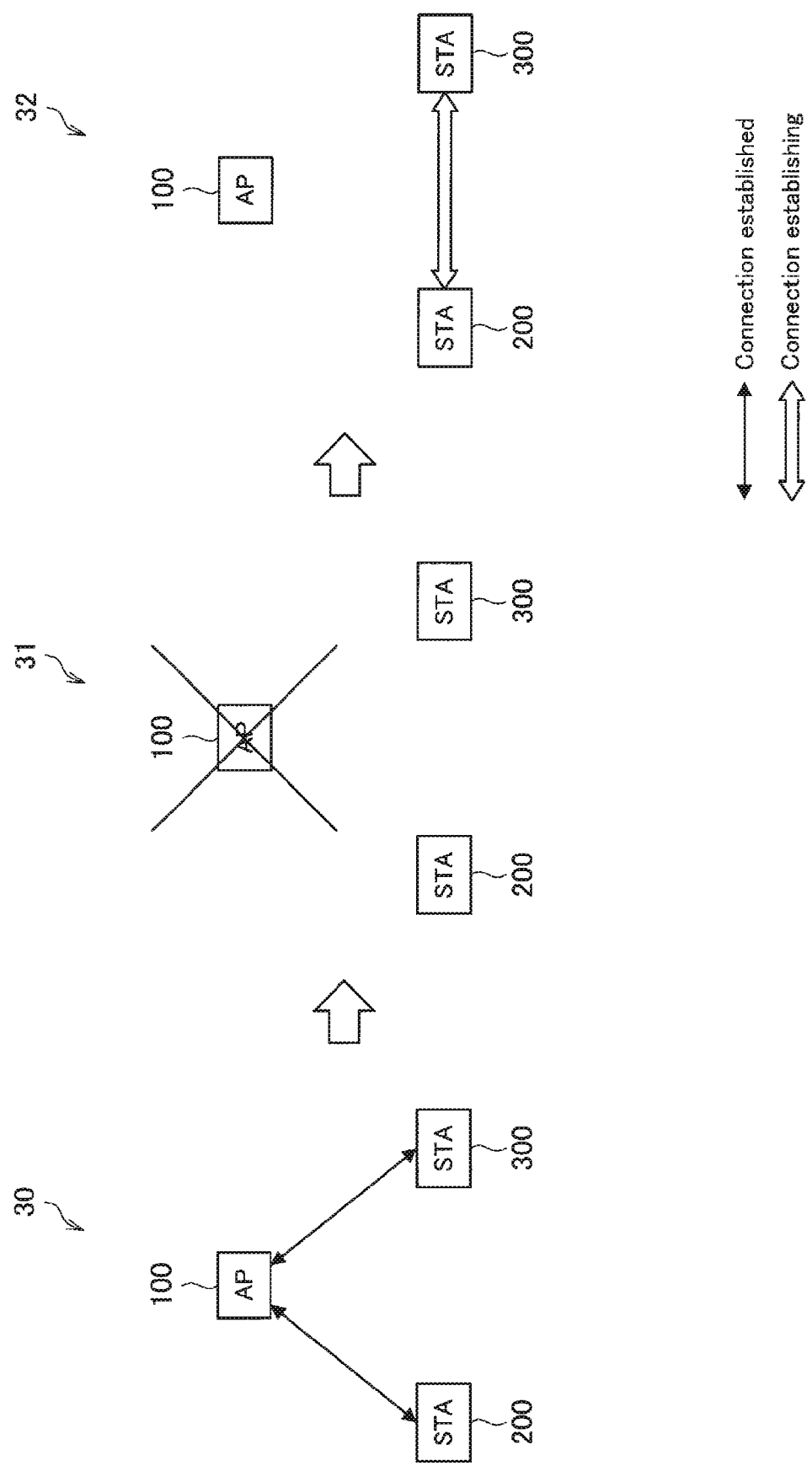
FIG. 15 is a diagram illustrated to describe situation setting according to a second embodiment.

FIG. 15 is a diagram illustrated to describe situation setting according to the present embodiment. As illustrated in FIG. 15, the STA 200 and the STA 300 first establish a connection for infrastructure communication via the AP 100 (reference numeral 30). Then, in the case where the AP 100 stops functioning or fails to satisfy the request delay of the application (e.g., Miracast) (reference numeral 31), the STA 200 and the STA 300 attempt to establish a connection for P2P communication (reference numeral 32).

<4.2. Technical Problem>

In the TDLS environment, in the case where the AP 100 stops functioning or the like as described above with reference to FIG. 15, the TDLS is re-setting up at the time of switching to the P2P communication. This occurrence of the re-setup processing necessitates time to switch to the P2P communication.

Thus, the present embodiment provides technology for simplifying the protocol for re-setting up the TDLS under the situation illustrated in FIG. 15.

<4.3. Technical Features>

(1) Configuration Information for P2P Communication

On condition that the connection for infrastructure communication with the AP 100 is established and the connection for infrastructure communication between a client (e.g., STA 200) and the AP 100 is established (i.e., implementation of the environment indicated by reference numeral 30), a group owner (e.g., the connection control unit 373 of the STA 300) notifies the client of the configuration information for P2P communication connection with the client using the infrastructure communication via the AP 100. At least SSID of a device varies during the infrastructure communication and during the P2P communication. Thus, the configuration information including SSID or the like is shared previously, so it is possible to reduce the processing time at the time of switching from the infrastructure communication to the P2P communication.

This configuration information is hereinafter also referred to as configuration information for P2P communication. Moreover, the credential to be used may also vary during the infrastructure communication and during the P2P communication. The credential will be described in detail later.

In establishing the connection for infrastructure communication, the STA 200 and the STA 300 negotiate which of them functions as a group owner (autonomous group owner). When a group owner is selected, the group owner shares the configuration information for P2P communication including SSID or the like used at the time of P2P communication with the client. The configuration information for P2P communication includes at least one of SSID, BSSID, MAC address, port information, device name, or group ID of the group owner. Moreover, SSID or the like on the client side may be shared as the configuration information for P2P communication. Moreover, the information exchange is performed over the encrypted channel of the infrastructure communication.

Here, the configuration information for P2P communication may be exchanged after it is checked that both the STA 200 and STA 300 support Wi-Fi Direct. In addition, the configuration information for P2P communication may be exchanged after the acceptance by the AP 100 is obtained.

Further, the switching from the infrastructure communication to the P2P communication may be performed in accordance with a user instruction. In one example, the STA 200 or the STA 300 may pop up an option as to whether to perform switching and may accept a user instruction. This makes it possible to prevent the connection switching that is undesired by the user. Moreover, the reception of the user instruction may be performed at the time of exchanging the configuration information for P2P communication.

The description will be given, on the assumption that the STA 200 is the source device and a client, and the STA 300 is the sink device and a group owner.

(2) Credentials

Credentials used in establishing the connection for P2P communication are considered. Credentials in the P2P communication may include a group transient key (GTK) that is a group key and a pre-shared key (PSK) that is a pre-shared key. In one example, in Wi-Fi Direct, when a client is connected once to a group owner, the client keeps the credential for connection with the group owner and reuses it when connecting again. Thus, in the case where the client holds the credentials, the processing time for the WPS at the time of reconnection is reduced as compared with the case where the client does not hold the credential. In the following, the reconnection will be described separately for a case where the client holds the credential and a case the client does not hold the credential.

—Case where Client Holds Credential

The client is only necessary to execute (invoke) a persistent group after recognizing SSID, group ID, and MAC address in accordance with the configuration information for P2P communication. The switching processing from infrastructure communication to P2P communication in the case where the client holds the credential will be described below with reference to FIG. 16.

Figure 16:
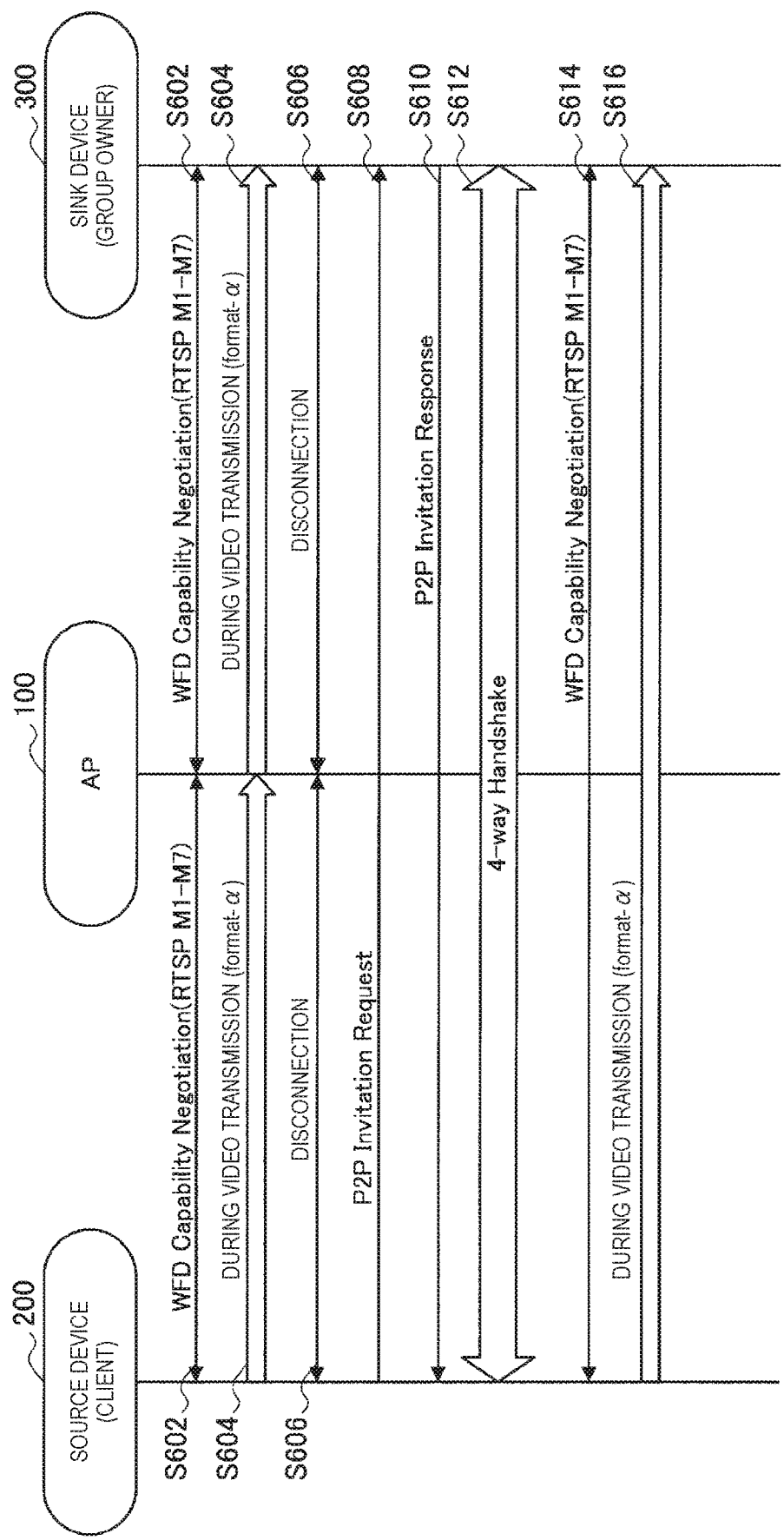
FIG. 16 is a sequence diagram illustrating an example of a procedure of processing for switching from infrastructure communication to P2P communication.

FIG. 16 is a sequence diagram illustrating an example of the procedure of switching processing from infrastructure communication to P2P communication. The sequence involves the AP 100, the source device 200, and the sink device 300.

First, the WFD capability negotiation is performed between the AP 100 and the source device 200 and between the AP 100 and the sink device 300 (step S602). The contents of the WFD capability negotiation are the same to those described above with reference to FIG. 3. Then, the video is transmitted from the source device 200 to the sink device 300 via the AP 100 (step S604).

Then, when the connections between the AP 100 and the source device 200 and between the AP 100 and the sink device 300 are disconnected (step S606), the source device 200 transmits a P2P invitation request to the sink device 300 (step S608). Next, the sink device 300 transmits a P2P invitation response to the source device 200 (step S610). Then, the source device 200 and the sink device 300 perform 4-way handshake (step S612), perform WFD capability negotiation (step S614), and resume video transmission (step S616).

—Case where Client Holds No Credential

In the case where the client does not hold credentials, the processing for WPS is performed in addition to the processing illustrated in FIG. 16. The switching processing from infrastructure communication to P2P communication in the case where the client does not hold credentials will be described below with reference to FIG. 17.

Figure 17:
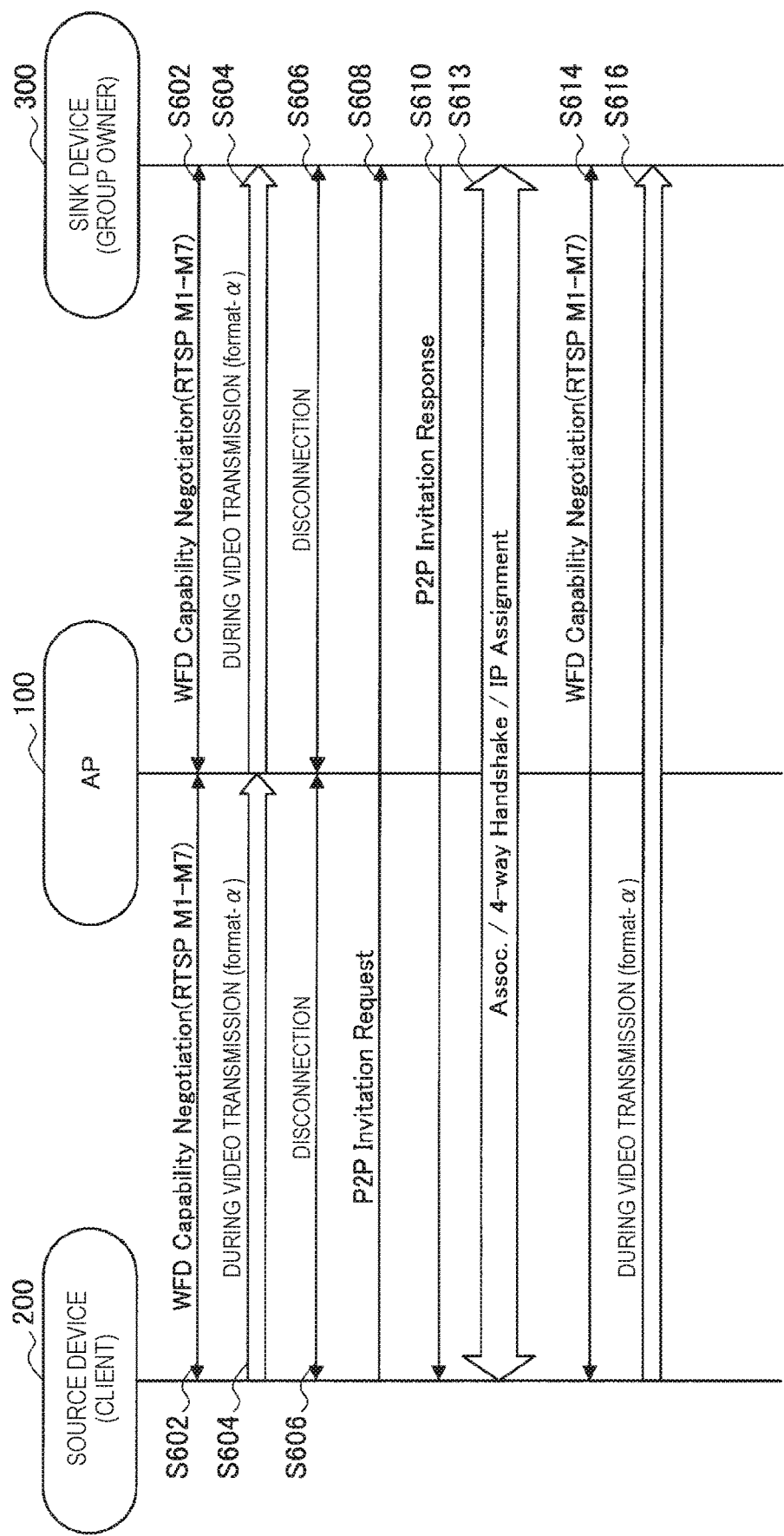
FIG. 17 is a sequence diagram illustrating an example of a procedure of processing for switching from infrastructure communication to P2P communication.

FIG. 17 is a sequence diagram illustrating an example of the procedure of the switching processing from infrastructure communication to P2P communication. The sequence involves the AP 100, the source device 200, and the sink device 300.

This sequence is different from the sequence illustrated in FIG. 16 in that step S613 is included in place of step S612 of the sequence illustrated in FIG. 16. In step S613, the source device 200 and the sink device 300 perform association and IP address assignment, in addition to the 4-way handshake.

Referring to FIGS. 16 and 17, in the case where the client holds no credentials, the association and IP address assignment are performed additionally as compared with the case where the client holds credentials, and so it can be seen that processing time is necessary to be taken correspondingly. Thus, the present embodiment provides a mechanism capable of performing the switching in the sequence illustrated in FIG. 16, thereby reducing the processing time, by notifying credentials in advance, even in the case where the client holds no credentials (i.e., it has never been connected in the past).

In one example, the client acquires the GTK from the group owner at the time of the association or 4-way handshake. In addition, the client acquires a key used between the STA 200 and the STA 300 at the time of establishing the connection for infrastructure communication as a PSK using any suitable algorithm. Here, such information exchange is performed over the encrypted channel of the infrastructure communication. Specifically, the WSC processing of Wi-Fi Direct may be performed over the infrastructure communication channel. Moreover, credentials may also be obtained as one piece of the configuration information for P2P communication.

(3) Policy

Then, the policy for the STA 200 and the STA 300 to perform efficiently the Wi-Fi Direct connection is considered.

The state in which the PSK is shared between the group owner and the client is assumed as described above with respect to credentials. In this case, when the exchange from infrastructure communication to P2P communication is performed, a method of changing only a PassPhrase and omitting the processing for WPS may be employed. Alternatively, a method may be employed in which the PSK is regenerated and exchanged in advance in accordance with some rules before or after Wi-Fi Direct is started or in which the PSK is refreshed in some way and used over the Wi-Fi Direct line. By employing such a policy, processing delay for the WPS processing can be reduced.

(4) IP Address

Then, a method of changing the IP address will be described. In the infrastructure communication, the AP 100 functions as a DHCP server, or the DHCP server is arranged on the network side of the AP 100. On the other hand, in P2P communication, the group owner functions as the DHCP server.

Thus, when the switching from infrastructure communication to P2P communication is performed, the group owner activates the DHCP server and assigns the IP address. In addition, in a case where HDCP is used in Miracast, processing for reconnecting HDCP is necessary to be performed as the assignment of IP address is changed. It is desirable to reduce such processing time.

Thus, the DHCP server is shared between during infrastructure communication and during P2P communication. In addition, the IP address during infrastructure communication and the IP address during P2P communication are assumed to be operated on the same subnet. In addition, during infrastructure communication, it is assumed that the AP 100 functions as the DHCP server and the IP addresses of the AP 100 and the group owner are also exchanged. Such a mechanism makes it possible to continue to use the IP addresses of the source device and the sink device in the line between the source device 200 and the sink device 300, which are originally capable of DHCP authentication, as long as the IP addresses are not changed. Furthermore, in the transmission of video or audio from the source device 200 to the sink device 300, it is possible to reduce time necessary for the assignment of IP address. Moreover, it is preferable that the DHCP policy of the source device is equivalent to the DHCP policy of the sink device.

(5) Supplement

Although the above description is given on the assumption that the source device 200 is a client and the sink device 300 is a group owner, the present technology is not limited to this example. In one example, the source device 200 may be a group owner and the sink device 300 may be a client. In this case, the proxy server of the DHCP server included in the source device 200 becomes the DHCP server managed using infrastructure communication. In addition, when the switching from infrastructure communication to P2P communication is performed, the IP address information set by the DHCP server may be transferred from the AP 100 to the source device 200 that is the group owner. Then, the DHCP server of the group owner may continue to use the IP address during infrastructure communication.

Further, an application such as Miracast may operate between the source device 200 and the sink device 300. For such an application, it is considered that the processing in the case where the destination is changed from the AP 100 to the sink device 300 is simpler than that in the case where the transmission source is changed. Thus, it is preferable that the sink device 300 functions as a group owner without changing the IP address of the source device 200, and the sink device 300 takes over the IP address used by the AP 100. Thus, at the time of switching to the P2P communication, the application may select which of STA 200 or STA 300 is to be a group owner.

Further, both the infrastructure communication and the P2P communication may be used for transmitting the content from the source device 200 to the sink device 300. Content transmitted over these two transmission paths may be the same or different. In general, if the frequency channels are the same, the service distance is longer in the infrastructure communication than in the P2P communication. However, in the infrastructure communication, in the case where the same frequency channel is used for the uplink (i.e., communication from the source device 200 to the AP 100) and the downlink (i.e., communication from the AP 100 to the sink device 300), the transmission band is narrow. Thus, in one example, content that is necessary for reliable data transmission using infrastructure communication may be transmitted, and other contents may be transmitted using P2P communication. In one example, video may be transmitted using infrastructure communication, and audio may be transmitted using P2P communication. Such content transmission using both infrastructure communication and P2P communication allows stable content transmission to be implemented.

<4.4. Processing Procedure>

Figure 18:
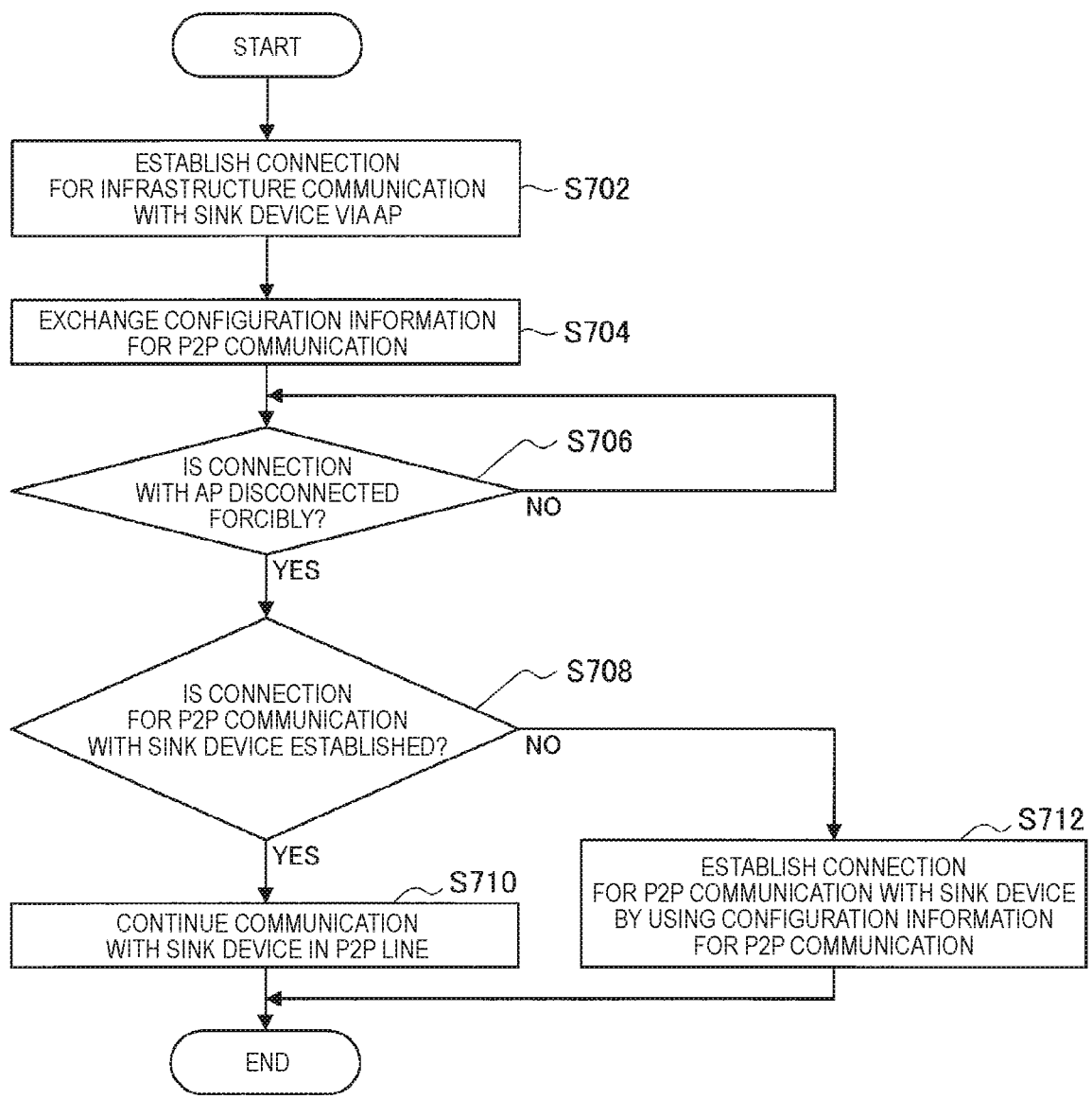
FIG. 18 is a flowchart illustrating an example of a procedure of connection switching processing executed in a source device according to the present embodiment.

FIG. 18 is a flowchart illustrating an example of the procedure of the connection switching processing executed in the source device 200 according to the present embodiment.

The source device 200 first establishes a connection for infrastructure communication with the sink device 300 via the AP 100 (step S702). Next, the source device 200 exchanges the configuration information for P2P communication with the sink device 300.

The source device 200 remains in its state until the connection with the AP 100 is forcibly disconnected (NO in step S706), and in a case where the forcible disconnection is made (YES in step S706), and then determines whether the connection for P2P communication with the sink device 300 has been established (step S708).

In a case where it is determined that the connection for P2P communication has been established (YES in step S708), the source device 200 continues the communication (e.g., content transmission) with the sink device 300 using the P2P line that has been established (step S710). On the other hand, in a case where it is determined that the connection for P2P communication is not established (NO in step S708), the source device 200 establishes a connection for P2P communication with the sink device 30 using the configuration information for P2P communication (step S712).

Moreover, although the processing procedure in the source device 200 is described above, similar processing can be performed in the sink device 300.

5. Application Example

The technology according to the present disclosure is applicable to various products. For example, the STA 200 and the STA 300 may be realized as mobile terminals such as smartphones, tablet PCs (Personal Computers), notebook PCs, portable game terminals, or digital cameras, fixed-type terminals such as compound eye camera (including cameras capable of 360-degree shooting in simultaneous or composite processing), television receivers, printers, digital scanners, or network storages, or car-mounted terminals such as car navigation devices. In addition, the STA 200 and the STA 300 may be realized as terminals that perform M2M (Machine to Machine) communication (also referred to as MTC (Machine Type Communication) terminals) such as smart meters, vending machines, remotely controlled surveillance devices, or POS (Point Of Sale) terminals. Furthermore, the STA 200 and the STA 300 may be wireless communication modules mounted in such terminals (for example, integrated circuit modules configured by one die).

On the other hand, for example, the AP 100 may be realized as a wireless LAN access point (also referred to as a wireless base station) which has a router function or does not have a router function. In addition, the AP 100 may be realized as a mobile wireless LAN router. Further, the AP 100 may also be a wireless communication module (for example, an integrated circuit module configured with one die) mounted on the device.

<5-1. First Application Example>

Figure 19:
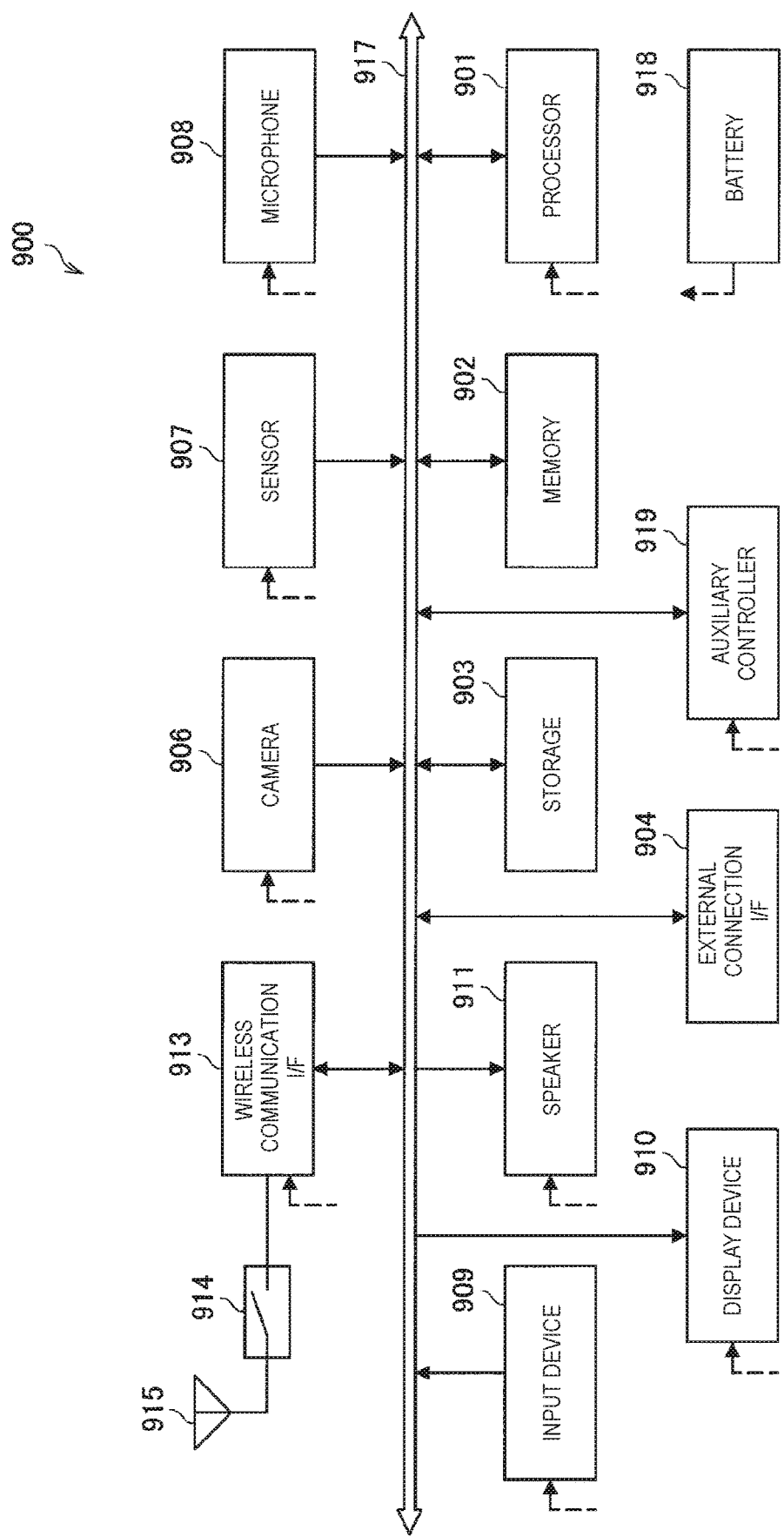
FIG. 19 is a block diagram illustrating an example of a schematic configuration of a smartphone.

FIG. 19 is a block diagram showing an example of a schematic configuration of a smartphone 900 to which the technology of the present disclosure can be applied. The smartphone 900 includes a processor 901, a memory 902, a storage 903, an external connection interface 904, a camera 906, a sensor 907, a microphone 908, a input device 909, a display device 910, a speaker 911, a wireless communication interface 913, an antenna switch 914, an antenna 915, a bus 917, a battery 918, and an auxiliary controller 919.

The processor 901 may be, for example, a CPU (Central Processing unit) or an SoC (System on Chip), and controls functions of an application layer and other layers of the smartphone 900. The memory 902 includes a RAM (Random Access Memory) and a ROM (Read Only Memory), and stores programs and data executed by the processor 901. The storage 903 can include a storage medium such as a semiconductor memory or a hard disk. The external connection interface 904 is an interface for connecting an externally attached device such as a memory card or a USB (Universal Serial Bus) device to the smartphone 900.

The camera 906 has an image sensor such as a CCD (Charge Coupled Device) or a CMOS (Complementary Metal Oxide Semiconductor), to generate captured images. The sensor 907 can include a sensor group including, for example, a positioning sensor, a gyro sensor, a geomagnetic sensor, an acceleration sensor, and the like. The microphone 908 converts sound that is input to the smartphone 900 into audio signals. The input device 909 includes, for example, a touch sensor that detects touches on a screen of the display device 910, a key pad, a keyboard, buttons, switches, and the like, to receive manipulations or information inputs from a user. The display device 910 has a screen such as a liquid crystal display (LCD), or an organic light emitting diode (OLED) display to display output images of the smartphone 900. The speaker 911 converts audio signals output from the smartphone 900 into sound.

The wireless communication interface 913 supports one or more wireless LAN standards of IEEE 802.11a, 11b, 11g, 11n, 11ac, and 11ad, to execute the wireless communication. The wireless communication interface 913 can communicate with another device via a wireless LAN access point in an infrastructure mode. In addition, the wireless communication interface 913 can directly communicate with another device in a direct communication mode such as an ad hoc mode or Wi-Fi Direct (registered trademark). Note that Wi-Fi Direct is different from the ad hoc mode, and thus one of two terminals operates as an access point. However, communication is performed directly between the terminals. The wireless communication interface 913 can typically include a baseband processor, an RF (Radio Frequency) circuit, a power amplifier, and the like. The wireless communication interface 913 may be a single-chip module on which a memory that stores a communication control program, a processor that executes the program, and a relevant circuit are integrated. The wireless communication interface 913 may support another kind of wireless communication scheme such as a cellular communication scheme, a short-range wireless communication scheme, or a proximity wireless communication scheme in addition to the wireless LAN scheme. The antenna switch 914 switches a connection destination of the antenna 915 for a plurality of circuits (for example, circuits for different wireless communication schemes) included in the wireless communication interface 913. The antenna 915 has a single or a plurality of antenna elements (for example, a plurality of antenna elements constituting a MIMO antenna), and is used by the wireless communication interface 913 for transmission and reception of wireless signals.

Note that the smartphone 900 may include a plurality of antennas (for example, an antenna for a wireless LAN and an antenna for a proximity wireless communication scheme), without being limited to the example in FIG. 19. In this case, the antenna switch 914 may be omitted from the configuration of the smartphone 900.

The bus 917 connects the processor 901, the memory 902, the storage 903, the external connection interface 904, the camera 906, the sensor 907, the microphone 908, the input device 909, the display device 910, the speaker 911, the wireless communication interface 913, and the auxiliary controller 919 to one another. The battery 918 supplies electric power to each of the blocks of the smartphone 900 shown in FIG. 19 via power supply lines partially indicated by dashed lines in the drawing. The auxiliary controller 919 causes, for example, necessary minimum functions of the smartphone 900 to be operated in a sleep mode.

In the smartphone 900 illustrated in FIG. 19, one or more components included in the STA 200 described above with reference to FIG. 5 (e.g., at least any one of the wireless communication unit 220, the control signal transmission/reception unit 230, the processing unit 240, the image/audio signal generation unit 250, the image/audio compression unit 260, or the stream transmission unit 270) may be provided in the wireless communication interface 913. In addition, in the smartphone 900 illustrated in FIG. 19, one or more components included in the STA 300 described above with reference to FIG. 6 (e.g., at least any one of the wireless communication unit 320, the stream reception unit 330, the image/audio decompression unit 340, the processing unit 370, or the control signal transmission/reception unit 380) may be provided in the wireless communication interface 913. In addition, at least some of these components may be provided in the processor 901 or the auxiliary controller 919. In one example, the smartphone 900 may be equipped with a module including the wireless communication interface 913, the processor 901, and/or the auxiliary controller 919, and one or more of the above-described components may be provided in the module. In this case, the module may store a program for causing the processor to function as the one or more components (i.e., a program for causing the processor to execute the operation of the one or more components), and may execute the program. In another example, the program for causing a processor to function as one or more of the above-described components may be installed in the smartphone 900, and the wireless communication interface 913, the processor 901, and/or the auxiliary controller 919 may execute the program. As described above, the smartphone 900 or the above-described module may be provided as a device including the one or more components, or the program for causing the processor to function as the one or more components may be provided. In addition, a readable recording medium in which the above-described program is recorded may be provided.

Further, in the smartphone 900 illustrated in FIG. 19, the antenna unit 210 described with reference to FIG. 5 or the antenna unit 310 described with reference to FIG. 6 may be provided in the antenna 915. In addition, the output unit 290 described with reference to FIG. 5 or the image/audio output unit 350 described with reference to FIG. 6 may be provided in the display device 910 or the speaker 911. In addition, the operation reception unit 280 described with reference to FIG. 5 or the operation reception unit 360 described with reference to FIG. 6 may be provided in the input device 909.

Note that the smartphone 900 may operate as a wireless access point (software AP) as the processor 901 executes the function of an access point at an application level. In addition, the wireless communication interface 913 may have the function of a wireless access point.

<5.2. Second Application Example>

Figure 20:
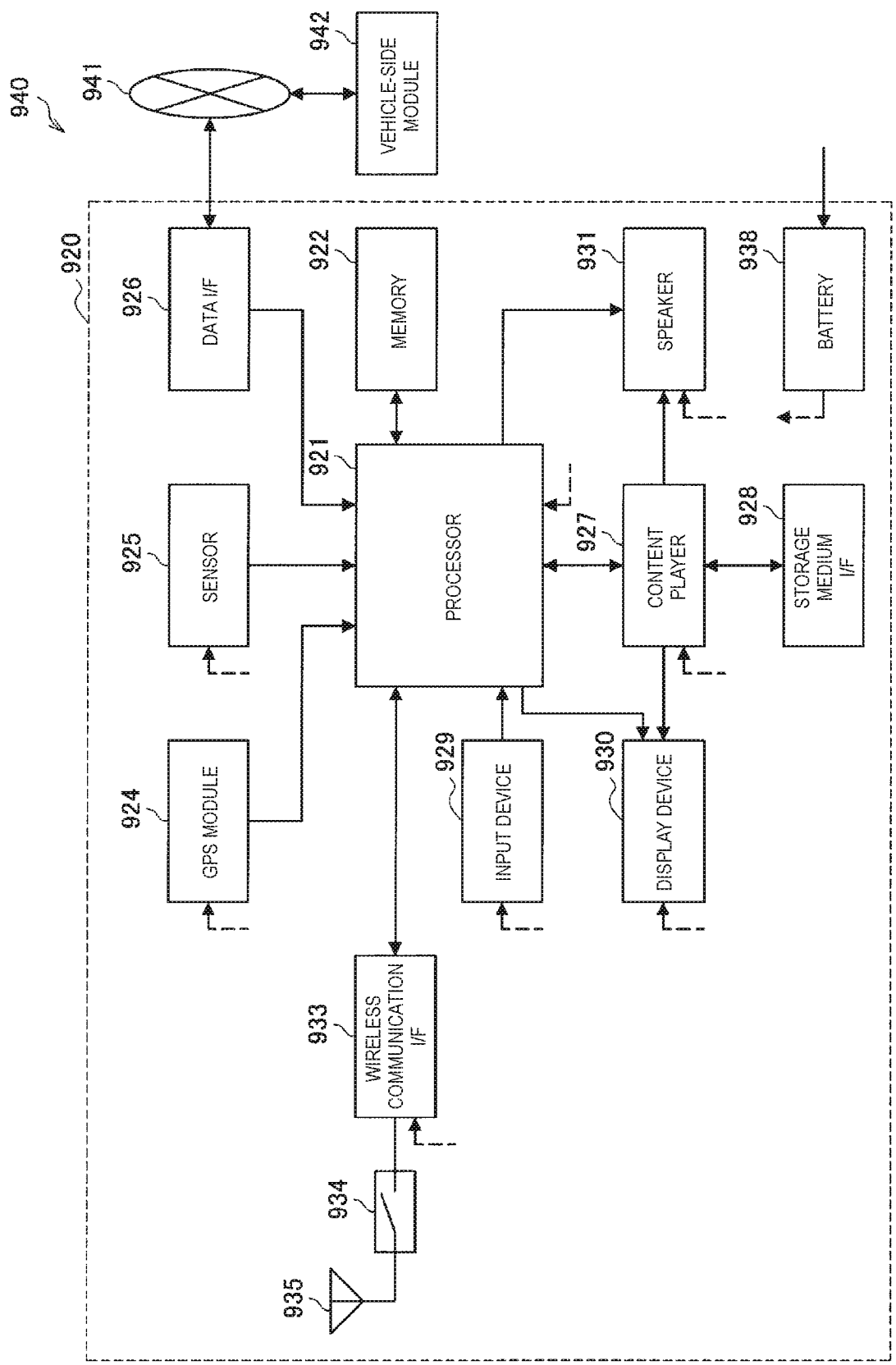
FIG. 20 is a block diagram illustrating an example of a schematic configuration of a car navigation device.

FIG. 20 is a block diagram showing an example of a schematic configuration of a car navigation device 920 to which the technology of the present disclosure can be applied. The car navigation device 920 includes a processor 921, a memory 922, a GPS (Global Positioning System) module 924, a sensor 925, a data interface 926, a content player 927, a storage medium interface 928, an input device 929, a display device 930, a speaker 931, a wireless communication interface 933, an antenna switch 934, an antenna 935, and a battery 938.

The processor 921 may be, for example, a CPU or an SoC controlling a navigation function and other functions of the car navigation device 920. The memory 922 includes a RAM and a ROM storing data and programs to be executed by the processor 921.

The GPS module 924 measures a position of the car navigation device 920 (for example, latitude, longitude, and altitude) using GPS signals received from a GPS satellite. The sensor 925 can include a sensor group including, for example, a gyro sensor, a geomagnetic sensor, a barometric sensor, and the like. The data interface 926 is connected to an in-vehicle network 941 via, for example, a terminal that is not illustrated, to acquire data generated on the vehicle side such as car speed data.

The content player 927 reproduces content stored in a storage medium (for example, a CD or a DVD) inserted into the storage medium interface 928. The input device 929 includes, for example, a touch sensor that detects touches on a screen of the display device 930, buttons, switches, and the like to receive manipulations or information inputs from a user. The display device 930 has a screen such as an LCD or an OLED display to display images of the navigation function or reproduced content. The speaker 931 outputs sounds of the navigation function or reproduction content.

The wireless communication interface 933 supports one or more wireless LAN standards of IEEE 802.11a, 11b, 11g, 11n, 11ac, and 11ad, to execute wireless LAN communication. The wireless communication interface 933 can communicate with another device via a wireless LAN access point in the infrastructure mode. In addition, the wireless communication interface 933 can directly communicate with another device in a direct communication mode such as an ad hoc mode or Wi-Fi Direct. The wireless communication interface 933 can typically have a baseband processor, an RF circuit, a power amplifier, and the like. The wireless communication interface 933 may be a single-chip module on which a memory that stores a communication control program, a processor that executes the program, and a relevant circuit are integrated. The wireless communication interface 933 may support another kind of wireless communication scheme such as a short-range wireless communication scheme, a proximity wireless communication scheme, or the cellular communication scheme in addition to the wireless LAN scheme. The antenna switch 934 switches a connection destination of the antenna 935 for a plurality of circuits included in the wireless communication interface 933. The antenna 935 has a single or a plurality of antenna elements and is used by the wireless communication interface 933 for transmission and reception of wireless signals.

Note that the car navigation device 920 may include a plurality of antennas, without being limited to the example of FIG. 20. In this case, the antenna switch 934 may be omitted from the configuration of the car navigation device 920.

The battery 938 supplies electric power to each of the blocks of the car navigation device 920 shown in FIG. 20 via power supply lines partially indicated by dashed lines in the drawing. In addition, the battery 938 accumulates electric power supplied from the vehicle.

In the car navigation device 920 illustrated in FIG. 20, one or more components included in the STA 200 described above with reference to FIG. 5 (e.g., at least any one of the wireless communication unit 220, the control signal transmission/reception unit 230, the processing unit 240, the image/audio signal generation unit 250, the image/audio compression unit 260, or the stream transmission unit 270) may be provided in the wireless communication interface 933. In addition, in the car navigation device 920 illustrated in FIG. 20, one or more components included in the STA 300 described above with reference to FIG. 6 (e.g., at least any one of the wireless communication unit 320, the stream reception unit 330, the image/audio decompression unit 340, the processing unit 370, or the control signal transmission/reception unit 380) may be provided in the wireless communication interface 933. In addition, at least some of these functions may be provided in the processor 921. In one example, the car navigation device 920 may be equipped with a module including the wireless communication interface 933 and/or the processor 921, and one or more of the above-described components may be provided in the module. In this case, the module may store a program for causing the processor to function as the one or more components (i.e., a program for causing the processor to execute the operation of the one or more components), and may execute the program. In another example, the program for causing a processor to function as one or more of the above-described components may be installed in the car navigation device 920, and the wireless communication interface 933 and/or the processor 921 may execute the program. As described above, the car navigation device 920 or the above-described module may be provided as a device including the one or more components, or the program for causing the processor to function as the one or more components may be provided. In addition, a readable recording medium in which the above-described program is recorded may be provided.

Further, in the car navigation device 920 illustrated in FIG. 20, the antenna unit 210 described with reference to FIG. 5 or the antenna unit 310 described with reference to FIG. 6 may be provided in the antenna 935. In addition, the output unit 290 described with reference to FIG. 5 or the image/audio output unit 350 described with reference to FIG. 6 may be provided in the display device 930 or the speaker 931. In addition, the operation reception unit 280 described with reference to FIG. 5 or the operation reception unit 360 described with reference to FIG. 6 may be provided in the input device 929.

Further, wireless communication interface 933 may operate as the AP 100 described above and may provide a wireless connection to a terminal of a user in the vehicle.

Further, the technology of the present disclosure may be realized as an in-vehicle system (or a vehicle) 940 including one or more blocks of the above-described car navigation device 920, an in-vehicle network 941, and a vehicle-side module 942. The vehicle-side module 942 generates vehicle-side data such as a vehicle speed, the number of engine rotations, or failure information and outputs the generated data to the in-vehicle network 941.

<5.3. Third Application Example>

Figure 21:
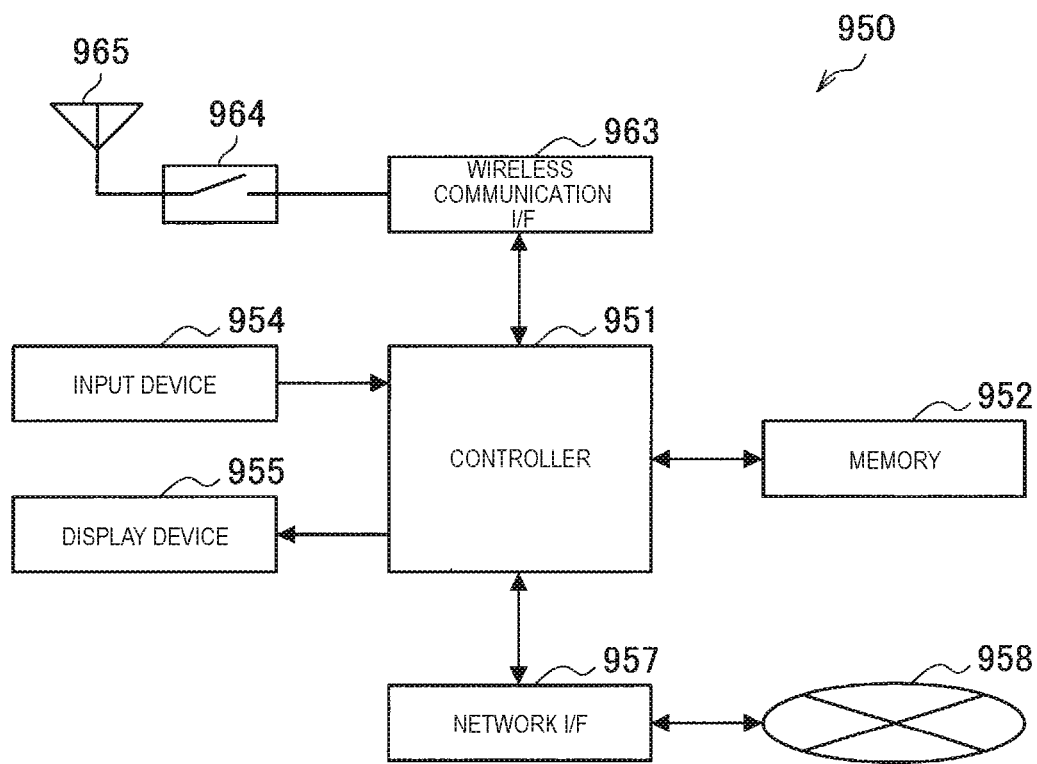
FIG. 21 is a block diagram illustrating an example of a schematic configuration of a wireless access point.

FIG. 21 is a block diagram showing an example of a schematic configuration of a wireless access point 950 to which the technology of the present disclosure can be applied. The wireless access point 950 includes a controller 951, a memory 952, an input device 954, a display device 955, a network interface 957, a wireless communication interface 963, an antenna switch 964, and an antenna 965.

The controller 951 may be, for example, a CPU or a digital signal processor (DSP) and causes various functions (for example, access limitation, routing, encryption, a fire wall, and log management) of the Internet Protocol (IP) layer and higher layers of the wireless access point 950 to be operated. The memory 952 includes a RAM and a ROM and stores a program executed by the controller 951 and various kinds of control data (for example, a terminal list, a routing table, an encryption key, security settings, and a log).

The input device 954 includes, for example, a button or a switch, and receives a manipulation from a user. The display device 955 includes an LED lamp and displays an operation status of the wireless access point 950.

The network interface 957 is a wired communication interface that connects the wireless access point 950 to a wired communication network 958. The network interface 957 may include a plurality of connection terminals. The wired communication network 958 may be a LAN such as Ethernet (registered trademark) or may be a Wide Area Network (WAN).

The wireless communication interface 963 supports one or more wireless LAN standards of IEEE 802.11a, 11b, 11g, 11n, 11ac, and 11ad, to supply wireless connection to a nearby terminal as an access point. The wireless communication interface 963 can typically include a baseband processor, an RF circuit, and a power amplifier. The wireless communication interface 963 may be a one-chip module in which a memory for storing a communication control program, a processor executing the program, and relevant circuits are integrated. The antenna switch 964 switches a connection destination of the antenna 965 among a plurality of circuits included in the wireless communication interface 963. The antenna 965 includes one antenna element or a plurality of antenna elements and is used to transmit and receive a wireless signal through the wireless communication interface 963.

In the wireless access point 950 illustrated in FIG. 21, one or more components included in the processing unit 150 described above with reference to FIG. 4 (e.g., at least any one of the wireless communication unit 120, the communication control unit 151, or the connection control unit 153) may be provided in the wireless communication interface 963. In addition, at least some of these functions may be provided in the controller 951. In one example, the wireless access point 950 may be equipped with a module including the wireless communication interface 963 and/or the controller 951, and one or more of the above-described components may be provided in the module. In this case, the module may store a program for causing the processor to function as the one or more components (i.e., a program for causing the processor to execute the operation of the one or more components), and may execute the program. In another example, the program for causing a processor to function as one or more of the above-described components may be installed in the wireless access point 950, and the wireless communication interface 963 and/or the controller 951 may execute the program. As described above, the wireless access point 950 or the above-described module may be provided as a device including the one or more components, or the program for causing the processor to function as the one or more components may be provided. In addition, a readable recording medium in which the above-described program is recorded may be provided.

Further, in the wireless access point 950 illustrated in FIG. 21, the antenna unit 110 described with reference to FIG. 4 may be provided in the antenna 965. In addition, the network communication unit 130 described with reference to FIG. 4 may be provided in the network interface 957. In addition, the storage unit 140 described with reference to FIG. 4 may be provided in the memory 952.

6. Closing Remarks

An embodiment of the present disclosure has been described in detail with reference to FIGS. 1 to 21.

As described in the first embodiment, the registrar notifies the AP of a message used to instruct the AP to establish a connection for infrastructure communication with the enrollee, on condition that the connection for P2P communication with the enrollee and the connection for infrastructure communication with the AP are established and the connection for infrastructure communication between the enrollee and the AP is not established. This allows the PBC mode start message, which has been notified by using the depression of a button as a trigger in the WSC standard in related art, to be notified automatically, thereby it is possible to reduce the time and effort such as depression of a button by the user. In addition, from the viewpoint of the AP or the enrollee, the connection processing using an external registrar is executed without any modification to the WSC standard in related art, so the security level disclosed in the WSC standard in related art is ensured.

As described above in the second embodiment, the group owner notifies the client of the configuration information used to establish the connection for P2P communication with the client using the infrastructure communication via the AP, on condition that the connection for infrastructure communication with the AP is established and the connection for infrastructure communication between the client and the AP is established. This allows the processing time when the infrastructure communication is switched to the P2P communication due to circumstances such as the case where the AP stops functioning or fails to satisfy the request delay of the application to be reduced.

The preferred embodiment(s) of the present disclosure has/have been described above with reference to the accompanying drawings, whilst the present disclosure is not limited to the above-described examples. A person skilled in the art may find various alterations and modifications within the scope of the appended claims, and it should be understood that they will naturally come under the technical scope of the present disclosure.

Further, in the present specification, the processing steps described using flowcharts and sequence diagrams are not necessarily executed in the order illustrated. Some processing steps may be executed in parallel. In addition, additional processing steps may be employed and some processing steps may be omitted.

Further, the effects described in this specification are merely illustrative or exemplified effects, and are not limitative. That is, with or in the place of the above effects, the technology according to the present disclosure may achieve other effects that are clear to those skilled in the art from the description of this specification.

Additionally, the present technology may also be configured as below.

(1)

A device including:

a processing unit configured to notify an access point of a message used to instruct the access point to establish a connection for infrastructure communication with another device on condition that a connection for P2P communication with the other device is established, a connection for infrastructure communication with the access point is established or there is a history in which the connection has been established, and a connection for infrastructure communication between the other device and the access point is not established.

(2)

The device according to (1), in which the processing unit notifies the other device of configuration information used for the connection with the access point, by using P2P communication.

(3)

The device according to (2), in which the configuration information includes at least any of a service set identifier (SSID), a basic service set identifier (BSSID), a media access control (MAC) address, port information, or a device name (DevName) of the access point.

(4)

The device according to (2) or (3), in which the processing unit notifies the access point of a message used to request the access point to accept the notification of the configuration information to the other device.

(5)
The device according to any one of (1) to (6),
in which the processing unit notifies the other device of a message used to instruct the other device to establish the connection for infrastructure communication with the access point, by using P2P communication.

(6)
The device according to (5),
in which the other device displays information relating to the connection for infrastructure communication by using reception of the message used to instruct to establish the connection for infrastructure communication with the access point as a trigger.

(7)
The device according to any one of (1) to (6),
in which the processing unit notifies the access point of information for identifying the other device.

(8)
The device according to (7),
in which the information for identifying the other device is a MAC address of the other device.

(9)
The device according to any one of (1) to (8),
in which the P2P communication is Wi-Fi Direct (registered trademark) or neighborhood area network (NAN) compliant communication.

(10)
The device according to any one of (1) to (9),
in which the infrastructure communication is Wi-Fi (registered trademark) compliant communication.

(11)
A device including:
a processing unit configured to start processing for establishing a connection for infrastructure communication with a second terminal device by using reception of a notification of a message from a first terminal device as a trigger, the message being used to instruct to start the connection for infrastructure communication with the second terminal device and being notified from the first terminal device in which a connection for infrastructure communication with its own device is established or there is a history in which the connection has been established and a connection for P2P communication with the second terminal device is established.

(12)
The device according to (11),
in which the processing unit notifies the second terminal device of a message used to instruct the second terminal device to start a connection for infrastructure communication with the first terminal device.

(13)
The device according to (12),
in which the processing unit broadcasts a beacon including information indicative of being operated in a push button configuration (PBC) mode.

(14)
The device according to (11),
in which the processing unit broadcasts a beacon including information used to instruct to switch from P2P communication to infrastructure communication.

(15)
The device according to any one of (11) to (14),
in which the processing unit identifies a probe request notified from the second terminal device among one or more notified probe requests by using information for identifying the second terminal device, the information being notified from the first terminal device.

(16)
The device according to any one of (11) to (15),
in which the processing unit notifies the first terminal device of a message indicating whether to accept a notification of configuration information used for a connection for infrastructure communication with its own device to the second terminal device.

(17)
The device according to any one of (11) to (16),
in which the processing unit notifies the first terminal device of a message indicating whether to accept concurrent connection for infrastructure communication between its own device and the first terminal device and P2P communication between the first terminal device and the second terminal device.

(18)
A device including:
a processing unit configured to notify another device of configuration information used for a connection for P2P communication with the other device by using infrastructure communication via an access point on condition that a connection for infrastructure communication with the access point is established and a connection for infrastructure communication between another terminal and the access point is established.

(19)
The device according to (18),
in which the configuration information includes at least any of a service set identifier (SSID), a basic service set identifier (BSSID), a media access control (MAC) address, port information, a device name (DevName), or a group ID of the device.

(20)
A method including:
notifying, by a processor, an access point of a message used to instruct the access point to establish a connection for infrastructure communication with another device, on condition that a connection for P2P communication with the other device is established, a connection for infrastructure communication with the access point is established or there is a history in which the connection has been established, and a connection for infrastructure communication between the other device and the access point is not established.

(21)
A method including:
starting, by a processor, processing for establishing a connection for infrastructure communication with a second terminal device by using reception of a notification of a message from a first terminal device as a trigger, the message being used to instruct to start the connection for infrastructure communication with the second terminal device and being notified from the first terminal device in which a connection for infrastructure communication with its own device is established or there is a history in which the connection has been established and a connection for P2P communication with the second terminal device is established.

(22)
A method including:
notifying, by a processor, another device of configuration information used for a connection for P2P communication with the other device by using infrastructure communication via an access point on condition that a connection for infrastructure communication with the access point is established and a connection for infrastructure communication between another terminal and the access point is established.

REFERENCE SIGNS LIST 1 system
100 AP
110 antenna unit
120 wireless communication unit
130 network communication unit
140 storage unit
150 processing unit
151 communication control unit
153 connection control unit
200 STA, registrar, source device
210 antenna unit
220 wireless communication unit
230 control signal transmission/reception unit
240 processing unit
241 content control unit
243 connection control unit
250 image/audio signal generation unit
260 image/audio compression unit
270 stream transmission unit
280 operation reception unit
290 output unit
300 STA, enrollee, sink device
310 antenna unit
320 wireless communication unit
330 stream reception unit
340 image/audio decompression unit
350 image/audio output unit
351 display unit
352 audio output unit
360 operation reception unit
370 processing unit
371 content control unit
373 connection control unit
380 control signal transmission/reception unit

The invention claimed is:

1. A first device, comprising:
a processing unit configured to:
notify an access point of a first message, wherein
the access point establishes, based on the first message, a first connection with a second device for an infrastructure communication, and
the access point is notified based on
establishment of a second connection between the first device and the second device for a P2P communication,
one of establishment of a third connection between the first device and the access point for the infrastructure communication or a history of the third connection, and
an absence of the first connection between the second device and the access point for the infrastructure communication; and
notify the second device of a second message based on the P2P communication, wherein
the second device establishes, based on the second message, a fourth connection with the access point for the infrastructure communication.

2. The first device according to claim 1, wherein the processing unit is further configured to notify, based on the P2P communication, the second device of configuration information, and the first connection is based on the configuration information.

3. The first device according to claim 2, wherein the configuration information includes at least one of a service set identifier (SSID) of the access point, a basic service set identifier (BSSID) of the access point, a media access control (MAC) address of the access point, port information of the access point, or a device name (DevName) of the access point.

4. The first device according to claim 2, wherein
the processing unit is further configured to notify the access point of a third message, and
the access point accepts the notification of the configuration information based on the third message.

5. The first device according to claim 1, wherein the second device displays information that corresponds to the fourth connection for the infrastructure communication, based on the notification of the second message.

6. The first device according to claim 1, wherein the processing unit is further configured to notify the access point of information for identification of the second device.

7. The first device according to claim 6, wherein the information includes a MAC address of the second device.

8. The first device according to claim 1, wherein the P2P communication is one of a Wi-Fi Direct (registered trademark) or a neighborhood area network (NAN) compliant communication.

9. The first device according to claim 1, wherein the infrastructure communication is a Wi-Fi (registered trademark) compliant communication.

10. A device, comprising:
a processing unit configured to:
establish a first connection with a first terminal device for an infrastructure communication based on reception of a notification of a first message from a second terminal device, wherein
the first message is received as a trigger for the establishment of the first connection for the infrastructure communication,
the second terminal device notifies the device of the first message based on
establishment of a second connection between the first terminal device and the second terminal device for a P2P communication, and
one of establishment of a third connection between the device and the second terminal device for the infrastructure communication or a history of the third connection, and
the second terminal device notifies the first terminal device of a second message based on the P2P communication, wherein
the first terminal device establishes, based on the second message, a fourth connection with the device for the infrastructure communication.

11. The device according to claim 10, wherein
the processing unit is further configured to notify the first terminal device of a third message, and
the first terminal device starts, based on the third message, a fifth connection with the second terminal device for the infrastructure communication.

12. The device according to claim 11, wherein the processing unit is further configured to broadcast a beacon including information indicating that the device is operative in a push button configuration (PBC) mode.

13. The device according to claim 11, wherein the processing unit is further configured to broadcast a beacon including information to instruct the device to switch from the P2P communication to the infrastructure communication.

14. The device according to claim 10, wherein
the processing unit is further configured to identify a probe request of the first terminal device from a plurality of notified probe requests based on information for identification of the first terminal device, and
the information is notified from the second terminal device.

15. The device according to claim 10, wherein
the processing unit is further configured to notify the second terminal device of a fourth message that indicates a notification of configuration information, and
the configuration information is for a fifth connection for the infrastructure communication between the device and the first terminal device.

16. The device according to claim 10,
wherein the processing unit is further configured to notify the second terminal device of a fifth message for execution of concurrent connection for the infrastructure communication between the device and the second terminal device, and the P2P communication between the first terminal device and the second terminal device.

17. A first device, comprising:
a processing unit configured to:
receive a user instruction, wherein the user instruction indicates an instruction to switch an infrastructure communication to a P2P communication; and
notify, via an access point, a second device of configuration information based on the infrastructure communication and the received user instruction, wherein
the configuration information is for a first connection between the first device and the second device for the P2P communication,
the configuration information includes at least one of a media access control (MAC) address of the first device, port information of the first device, or a device name (DevName) of the first device, and
the second device is notified based on establishment of a second connection between the first device and the access point for the infrastructure communication and establishment of a third connection between the second device and the access point for the infrastructure communication.

18. A method, comprising:
in a first device comprising a processor:
notifying, by the processor, an access point of a first message, wherein
the access point establishes, based on the first message, a first connection with a second device for an infrastructure communication, and
the access point is notified based on
establishment of a second connection between the first device and the second device for a P2P communication,
one of establishment of a third connection between the first device and the access point for the infrastructure communication or a history of the third connection, and
an absence of the first connection between the second device and the access point for the infrastructure communication; and
notifying, by the processor, the second device of a second message based on the P2P communication, wherein
the second device establishes, based on the second message, a fourth connection with the access point for the infrastructure communication.

\* \* \* \* \*